United States Patent [19]
Yasushi

[11] Patent Number: 5,327,396
[45] Date of Patent: Jul. 5, 1994

[54] UNDERWATER DETECTION SYSTEM
[75] Inventor: Nishimori Yasushi, Toyonaka, Japan
[73] Assignee: Furuno Electric Company, Limited, Hyogo, Japan
[21] Appl. No.: 847,070
[22] PCT Filed: Aug. 9, 1991
[86] PCT No.: PCT/JP91/01066
    § 371 Date: Apr. 9, 1992
    § 102(e) Date: Apr. 9, 1992
[87] PCT Pub. No.: WO92/02830
    PCT Pub. Date: Feb. 20, 1992
[30] Foreign Application Priority Data
    Aug. 9, 1990 [JP] Japan ............... 2-212075
    Jun. 6, 1991 [JP] Japan ............... 3-134953
    Jul. 19, 1991 [JP] Japan ............... 3-179559
[51] Int. Cl.⁵ .................... G01S 15/50; G01S 15/04
[52] U.S. Cl. ................................. 367/90; 367/87; 367/94
[58] Field of Search ............... 367/90, 91, 94, 104, 367/87; 73/861.25; 342/104

[56] References Cited
U.S. PATENT DOCUMENTS

| 4,069,468 | 1/1978 | Bartram | 367/91 |
| 4,425,634 | 1/1984 | Iino et al. | 367/104 |
| 4,573,477 | 3/1986 | Namekawa et al. | 73/861.25 |
| 4,680,739 | 7/1987 | Lannuzel | 367/91 |

FOREIGN PATENT DOCUMENTS
1299485 12/1989 Japan.

Primary Examiner—Daniel T. Pihulic

[57] ABSTRACT

An underwater detection system which searches the water in a wide range of directions and displays moving targets in different colors depending on speeds of the targets comprises an ultrasonic transmitting unit (101) for radiating a search pulse having a carrier frequency in a wide range of directions, an ultrasonic receiving unit (1p, 1q) for successively searching areas in mutually different directions in the wide range of directions to receive ultrasonic signals coming from each of respective directions therein at least two times, a phase difference detector (10, 12), detecting a phase difference between the carriers of the reception signals having come from the same direction in the wide range of directions and caught by the ultrasonic receiving unit, a calculator (18 calculating the angular frequency of the reception signals based on the phase difference of the carriers of signals, a color signal generator (103), producing predetermined color signals corresponding to angular frequencies based on signals representative of the angular carrier frequency outputted by the calculator, and a display (104), displaying output signals of the color signal generator.

29 Claims, 12 Drawing Sheets

FIG. 1
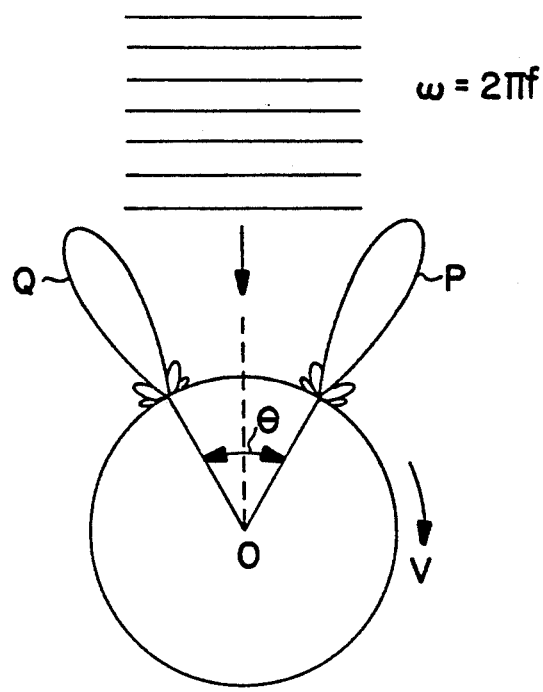
FIG. 2(A) p(t)
FIG. 2(B) q(t)
FIG. 2(C) pτ(t)
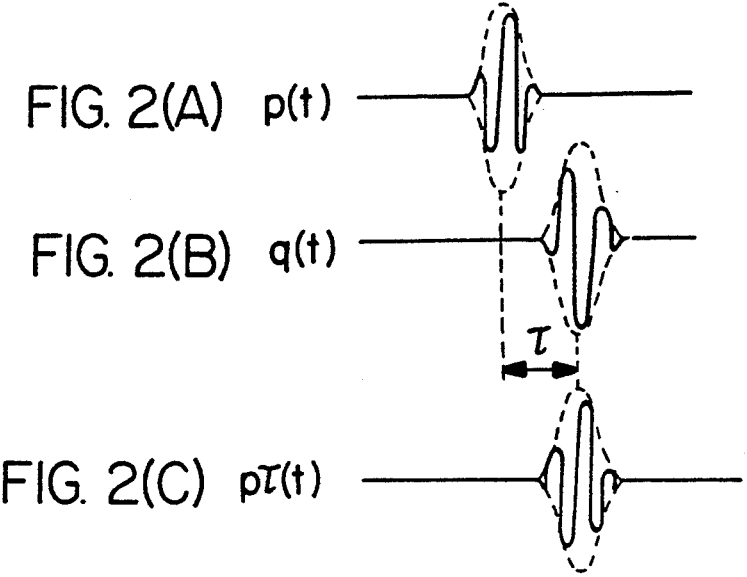

UNDERWATER DETECTION SYSTEM

TECHNICAL FIELD

The present invention relates to an underwater detection system for searching the water in a wide range of directions. Particularly, it relates to an underwater detection system which is capable of detecting angular carrier frequencies (or carrier frequencies) of ultrasonic signals coming from search areas extending in a wide range of directions. Further, it relates to an apparatus for displaying moving targets in predetermined colors corresponding to angular carrier frequencies based on the detected angular carrier frequencies (or carrier frequencies) of incoming ultrasonic signals.

Hereinafter, the present invention will be explained as embodied in an underwater detection system which finds moving targets, for example, fish schools, detects angular carrier frequencies of ultrasonic signals reflected by the fish schools, and displays the fish schools in different colors corresponding to speeds of the fish schools based on the detected angular frequencies.

BACKGROUND ART

When a fish school is moving, the frequency of an ultrasonic signal reflected by the school of fish is shifted in frequency (Doppler frequency shift) due to the Doppler effect. Due to detection of the Doppler frequency shift ultrasonic echoes from a moving fish school can be distinguished from ultrasonic echoes reflected by a fixed target such as the seabed. Also, a fast or slow speed or the like of the moving fish school can be detected.

A prior art underwater detection system has been provided which detects a Doppler frequency shift (refer to, for example Japanese Unexamined Patent Application Publication No. 29975/1982).

However, the prior art apparatus was merely capable of detecting Doppler frequency shifts of ultrasonic signals coming from one specific direction, but was not capable of detecting Doppler frequency shifts of ultrasonic signals coming from the whole range of directions. Thus, information such as a fast or slow speed or the like of moving fish schools in a wide range of directions can not be obtained in a short time duration.

DISCLOSURE OF THE INVENTION

An object of the present invention is to provide an underwater detection system which receives ultrasonic signals coming from a wide range of directions and is capable of obtaining information relating to speeds of targets producing the ultrasonic signals in a short time duration.

Another object of the present invention is to provide an underwater detection system which receives ultrasonic signals coming from a wide range of directions and displays targets having produced the ultrasonic signals in different colors depending on speeds of the targets based on the received ultrasonic signals.

Another object of the present invention is to provide an underwater detection system which receives ultrasonic signals coming from a wide range of directions and detects angular frequencies of the carriers included in the received ultrasonic signals.

Another object of the present invention is to provide an underwater detection system which receives ultrasonic signals having a known carrier frequency coming from a wide range of directions and displays targets having produced the ultrasonic signals in different colors depending on speeds of the targets based on the received ultrasonic signals.

Another object of the present invention is to provide an underwater detection system which emits ultrasonic search signals in a wide range of directions and catches echo signals coming from the wide range of directions and displays targets having reflected the search signals in different colors depending of speeds of the targets based on the received echo signals.

Another object of the present invention is to provide an underwater detection system which emits ultrasonic search signals in a wide range of directions and detects angular frequencies (or frequencies) of the carriers included in echo signals coming from the wide range of directions and received.

Another object of the present invention is to provide an apparatus which detects angular carrier frequencies included in ultrasonic signals coming from a wide range of directions so that information such as speeds of fish schools or moving directions thereof or the like in the wide range of directions is obtained in a short time duration, and detects angular carrier frequencies so that interference waves can be eliminated.

According to a first feature of the present invention, an underwater detection system comprises ultrasonic receiving means for successively searching areas in different directions in a wide range of directions and receiving ultrasonic signals coming from the respective directions in the wide range of directions at least two times, phase difference detecting means for detecting a phase difference between the phases of carriers of received signals having come from the same direction in the wide range of directions and caught by the receiving means, and computation means for computing the angular frequency of the received signals based on the phase difference of the carriers of signals.

According to a second feature of the present invention, an underwater detection system comprises ultrasonic receiving means for successively searching areas in mutually different directions in a wide range of directions and receiving ultrasonic signals coming from the respective directions in the wide range of directions with a time difference therebetween, time adjusting means for adjusting a time difference in relation to respective received signals caught in each direction to remove the time difference between ultrasonic reception beams, phase difference detecting means for detecting a phase difference between phases of the carriers of received signals having come from the same direction and caught by the receiving means, and computation means for computing the angular frequency (or frequency) of the received signals based on the phase difference between the carriers of signals.

According to a third feature of the present invention, an underwater detection system comprises ultrasonic receiving means for rotating a plurality of ultrasonic reception beams about a reference point with a time difference therebetween, time adjusting means for adjusting the time difference in relation to received respective signals caught by the plurality of ultrasonic reception beams to remove the time difference between the ultrasonic reception beams, phase difference detecting means for detecting a phase difference between the phases of carriers of received signals respectively caught by the plurality of ultrasonic reception beams, and computation means for computing the angular frequency of received signals based on the phase difference between the carriers of signals.

According to a fourth feature of the present invention, an underwater detection system comprises ultrasonic receiving means for rotating first and second ultrasonic reception beams about a reference point in the same direction with a time difference therebetween, time adjusting means for adjusting a signal having come from a direction and caught by the first ultrasonic reception signal with respect to a signal having come from the same direction and caught by the second ultrasonic reception beam by the time difference so that the time difference between the ultrasonic reception beams is removed, orthogonal detecting means for detecting the reception signals caught by the first ultrasonic reception beam and outputted by the time adjusting means and the signals caught by the second ultrasonic reception beam, phase difference detecting means for detecting a phase difference between the phases of the carriers of the reception signals respectively caught by the first and the second ultrasonic reception beams based on the output signals of the orthogonal detecting means, and computation means for computing the angular frequency of the reception signals based on the phase difference between the carriers of signals.

According to a fifth feature of the present invention, an underwater detection system comprises ultrasonic receiving means comprised of ultrasonic transducers disposed on a circle at equal intervals, first switching means for switching the ultrasonic transducers to successively select a predetermined number of ultrasonic transducers out of the ultrasonic transducers, first and second phase combining means for combining in phase the output signals of the predetermined number of ultrasonic transducers supplied through the first switching means to respectively produce signals which are displaced by 90° in phase with each other, second switching means for switching the ultrasonic transducers to successively select the predetermined number of the ultrasonic transducers selected by the first switching means after a predetermined time elapses, third and fourth phase combining means for combining in phase the output signals of the predetermined number of ultrasonic transducers supplied through the second switching means to respectively produce signals which are displaced by 90° in phase with each other, time adjusting means for adjusting time with the signals outputted by the first and second phase combining means by the predetermined time to eliminate the time difference of the signals with respect to the signals outputted by the third and fourth phase combining means, phase difference detecting means for detecting a phase difference between the carrier of the reception signals outputted by the first switching means and the carrier of the reception signals outputted by the second switching means based on the output signals of the time adjusting means and on the output signals of the third and fourth phase combining means, and computation means for computing the angular frequency of the reception signals based on the phase differnce of the carriers of signals.

According to a sixth feature of the present invention, an underwater detection system comprises ultrasonic receiving means for directing first and second ultrasonic receiving transducers with a time difference therebetween successively in different directions in a wide range of directions, time adjusting means for adjusting in time reception signals caught by the first ultrasonic transducer with respect to corresponding signals caught by the second ultrasonic transducer so that the time difference between the two transducers will be eliminated, a first matched filter having an impulse response hc(t) and pulse-compressing the output signals of the time adjusting means, a second matched filter having an impulse response hs(t) and pulse-compressing the output signals of the time adjusting means, a third matched filter having an impulse response hc(t) and pulse-compressing the reception signals caught by the second ultrasonic transducer, a fourth matched filter having an impulse response hs(t) and pulse-compressing the reception signals caught by the second ultrasonic transducer, phase difference detecting means for detecting a phase difference between the carrier frequency of the reception signals caught by the first ultrasonic transducer and the carrier frequency of the reception signals caught by the second ultrasonic transducer based on the output signals of the first, second, third and fourth matched filters, and calculating means for calculating the angular frequency of reception signals based on the phase difference between the carriers.

According to a seventh feature of the present invention, an underwater detection system comprises ultrasonic receiving means for receiving ultrasonic signals coming from respective directions in a wide range of directions by rotating a single reception beam at a time period, time adjusting means for adjusting time in relation to each of the signals coming from respective directions and caught by a time difference corresponding to the time period so that the time difference due to the time period in receiving the signals is removed, phase difference detecting means for detecting a phase difference between reception signals coming from the direction and caught by the receiving means, and calculating means for calculating an angular frequency of reception signals based on the phase difference between the carriers.

According to an eighth feature of the present invention, an underwater detection system comprises ultrasonic receiving means comprised of ultrasonic transducers linearly disposed for repeatedly scanning the ultrasonic transducers at a period to receive coming ultrasonic signals, Fourier transforming circuit for Fourier-transforming reception signals caught by the ultrasonic receiving means, phase spectrum computing circuit for obtaining phase spectrum of the reception signals based on the signals resulting from the Fourier transformation performed in the Fourier transforming circuit, a phase difference calculating circuit for obtaining a phase difference in relation to ultrasonic signals coming from each direction by performing subtractions in phase between reception signals caught with the present scan of the ultrasonic transducers and reception signals obtained with the previous scans of the ultrasonic transducers based on phase spectrum obtained by the phase spectrum computing circuit, and an angular carrier frequency calculating circuit for calculating the angular carrier frequency of ultrasonic signals from targets based on the phase difference in relation to the respective reception signals detected by the phase difference calculating circuit.

According to a ninth feature of the present invention, an underwater detection system comprises ultrasonic receiving means for successively searching areas in mutually different directions in a wide range of directions to receive ultrasonic signals coming from respective directions in the wide range of directions at least two times, phase difference detecting means for detecting a phase difference between the carriers of the reception signals having come from the same direction in the wide range of directions and caught by the ultrasonic receiving means, calculating means for calculating an angular frequency of the reception signals based on the phase difference of the carriers of signals, color signal generating means for producing predetermined color signals corresponding to angular frequency based on signals representative of the angular frequency outputted by the angular frequency calculating means, and displaying means for displaying output signals of the color signal generating means.

According to a tenth feature of the present invention, an underwater detection system comprises ultrasonic transmitting means for emitting a search pulse signal having a carrier frequency in a wide range of directions, ultrasonic receiving means for successively searching areas in each of different directions at least two times in a wide range of directions to receive ultrasonic signals coming from respective directions in the wide range of directions, phase difference detecting means for detecting a phase difference between the carriers of the reception signals having come from the same direction in the wide range of directions and caught by the ultrasonic receiving means, calculating means for calculating an angular frequency of the reception signals based on the phase difference of the carriers of signals, color signal generating means for producing predetermined color signals corresponding to angular frequencies based on signals representative of the angular frequency outputted by the angular frequency calculating means, and displaying means for displaying output signals of the color signal generating means.

According to an eleventh feature of the present invention, an underwater detection system comprises ultrasonic transmitting means for radiating a search pulse signal having a carrier frequency in a wide range of directions, ultrasonic receiving means for successively searching areas in mutually different directions in the wide range of directions to receive ultrasonic signals coming from each of respective directions in the wide range of directions at a time interval, phase difference detecting means for detecting a phase difference between the carriers of the reception signals coming from the same direction in the wide range of directions and caught by the ultrasonic receiving means, calculating means for calculating an angular frequency of the reception signals based on the phase difference of the carriers, color signal generating means for producing predetermined color signals corresponding to angular frequencies based on signals representative of the angular frequency outputted by the angular frequency calculating means, and displaying means for displaying the output signals of the color signal generating means.

According to a twelfth feature of the present invention, an underwater detection system comprises ultrasonic transmitting means for radiating a search pulse signal having a carrier frequency in a wide range of directions, ultrasonic receiving means for successively directing a first and a second ultrasonic receiving transducers in each of different directions with a time difference therebetween in the wide range of directions, time adjusting means for adjusting in time reception signals caught by the first ultrasonic transducer with respect to signals caught by the second ultrasonic transducer by the time difference so that the time difference between the two transducers is removed, first matched filter having an impulse response hc(t) and pulse-compressing the output signals of the time adjusting means, second matched filter having an impulse response hs(t) and pulse-compressing the output signals of the time adjusting means, third matched filter having an impulse response hc(t) and pulse-compressing receptions signals caught by the second ultrasonic transducer, fourth matched filter having an impulse response hs(t) and pulse-compressing reception signals caught by the second ultrasonic transducer, phase difference detecting means for detecting a phase difference between the carriers of the reception signals caught by the first ultrasonic transducer and the carriers of the reception signals caught by the second ultrasonic transducer based on the output signals of the first, second, third and fourth matched filters, calculating means for calcultaing the angular frequency of the reception signals based on the phase difference of the carriers, color signal generating means for producing predetermined color signals corresponding to angular frequencies based on signals representative of the angular frequency outputted by the angular frequency calculating means, and displaying means for displaying output signals of the color signal generating means.

According to a thirteenth feature of the present invention, an underwater detection system comprises ultrasonic transmitting means for emitting a search pulse signal having a carrier frequency in a wide range of directions, ultrasonic receiving means for receiving ultrasonic signals coming from respective directions in a wide range of directions by rotating a single reception beam at a time period, time adjusting means for adjusting each of the signals coming from respective directions and caught by a time difference corresponding to the time period so that the time difference due to the time period in receiving the signals is removed, phase difference detecting means for detecting a phase difference between the carriers of reception signals coming from the same direction and caught by the receiving means, calculating means for calculating an angular frequency of the reception signals based on the phase difference between the carriers, color signal generating means for producing predetermined color signals corresponding to angular frequencies based on the angular frequency outputted by the angular frequency calculating means, and displaying means for displaying output signals of the color signal generating means.

According to a fourteenth feature of the present invention, an underwater detection system comprises ultrasonic transmitting means for emitting a search pulse signal having a carrier frequency in a wide range of directions, ultrasonic receiving means comprised of ultrasonic transducers linearly disposed for repeatedly scanning the ultrasonic transducers at a period to receive incoming ultrasonic signals, a Fourier transforming circuit for Fourier-transforming the reception signals caught by the ultrasonic receiving means, a phase spectrum computing circuit for obtaining phase spectrum of the reception signals based on the signals resulting from the Fourier transformation performed in the Fourier transforming circuit, a phase difference calculating circuit for obtaining phase differences in relation to ultrasonic signals coming from each direction by performing subtractions in phase between reception signals caught with the present scan of the ultrasonic transducers and reception signals obtained with the previous scans of the ultrasonic transducers based on the phase spectrum obtained by the phase spectrum computing circuit, an angular carrier frequency calculating circuit for calculating angular carrier frequencies of ultrasonic signals from targets based on the phase differences in relation to the respective reception signals detected by the phase difference calculating circuit, color signal generating means for producing predetermined color signals corresponding to angular frequencies based on the carrier frequencies outputted by the angular frequency calculating means, and displaying means for displaying output signals of the color signal generating means.

Referring to FIG. 1, there will be explained the principle of an embodiment according to the present invention.

Referring to FIG. 1, two ultrasonic reception beams "P" and "Q" are formed by two ultrasonic receiving units respectively. The two ultrasonic receiving units are rotated about a point "0" at a constant speed in a horizontal plane with the two receiving units being spaced by an angle "$\theta$". Thus, two ultrasonic reception beams "P" and "Q" are rotated about the point "0" at a constant speed in a horizontal plane with the two beams spaced by an angle "$\theta$" so that the water is swept by the beams. As shown in FIG. 2, the ultrasonic reception beams "P" and "Q" receive, for example, echo signals coming from one direction ("y" direction in this example) with a time differnce "$\tau$" therebetween respectively (refer to FIG. 2(a) and FIG. 2(b)). The ultrasonic receiving units forming the ultrasonic reception beams "P" and "Q" are rotated at a speed so that the Doppler effect is produced on ultrasonic signals generated by targets.

Reception signals caught by one ultrasonic reception beam foregoing by a time "$\tau$" with respect to the other beam are represented as p(t) as in the following equation:

$$P(t) = S(t) \cdot \cos\{\omega\tau + \alpha + m(t) + \beta\} \qquad (1)$$

Here S(t) is a term representing the amplitude determined by the directional characteristics of an ultrasonic reception beam and a speed of the reception beam scanned in a horizontal plane; cos{} is a term representing the phase; "$\omega$" represents an angular carrier frequency of ultrasonic signals coming from a target; "$\alpha$" is an initial phase of an incoming ultrasonic signal; "$\beta$" is a phase displacement generated in a receiving part; and m(t) is a term representing a modulation due to the Doppler effect produced when ultrasonic signals are received by rotating respective reception beams (when the respective ultrasonic reception beams "P" and "Q" are not moving or directed in a "x" direction which is perpendicular to a "y" direction from which ultrasonic signals come, the term will be m(t)=0). Thus "$\omega t + \alpha$" represents the phase of incoming ultrasonic signals, and "$m(t)+\beta$" represents an amount of phase variation due to a rotational movement of the ultrasonic reception beam "P".

Next, with reception signals q(t) received by the other ultrasonic reception beam "Q", the phase of incoming ultrasonic signals is expressed as "$\omega t + \alpha$" in the same way as with the signals obtained by the ultrasonic beam "P", but a phase variation due to a rotational movement of the ultrasonic reception beam "Q" will be "$m(t-\tau)+\beta$". Thus, the reception signal q(t) caught by the ultrasonic reception beam "Q" will be expressed as follows:

$$q(t) = S(t-\tau) \cdot \cos\{\omega t + \alpha + m(t-\tau) + \beta\} \qquad (2)$$

In order to remove effects due to the time difference "$\tau$" between the two rotating ultrasonic reception beams "P" and "Q", the signal p(t) in the equation (1) is delayed by the time difference "$\tau$" (refer to FIG. 2(c)). The resultant reception signal p$\tau$(t) will be as follows:

$$\begin{aligned} p\tau(t) &= S(t-\tau) \cdot \\ & \cos\{\omega(t-\tau) + \alpha + m(t-\tau) + \beta\} \\ &= S(t-\tau) \cdot \\ & \cos\{\omega t + \alpha + m(t-\tau) + \beta - \omega\tau\} \end{aligned} \qquad (3)$$

The phase difference "$\Delta\psi$" between the reception signals q(t) and p$\tau$(t) expressed with the equations (2) and (3) respectively is related to the angular carrier frequency of ultrasonic signals coming from a target. By comparing the two foregoing equations, it is apparent that there comes out an equation $\Delta\psi = \omega\tau$. Thus, it will be as follows:

$$\omega = \Delta\psi/\tau \qquad (4)$$

Since the time difference "$\tau$" is known, if the phase difference "$\Delta\psi$" is detected an angular carrier frequency "$\omega$" of ultrasonic signals is determined in accordance with the equation (4).

Referring to FIG. 12, there will be explained an operational principle of another embodiment according to the present invention.

Referring to FIG. 12, an ultrasonic receiving unit "T" is disposed on the x-axis in a two-dimensional plane (x, y). The ultrasonic receiving unit "T" is comprised of ultrasonic transducers "s" having omni-directional characteristics disposed linearly along the x-axis. It is assumed that ultrasonic signals (plane waves) propagate in a direction having an angle "$\theta$" with respect to the y-axis toward the ultrasonic receiving unit "T".

Here, an ultrasonic signal p (x, y, t) reaching the ultrasonic receiving unit "T" is expressed as follows:

$$P(x,y,t) = P_o \cdot \cos\{x \cdot k \cdot \sin\theta + y \cdot k \cdot \cos\theta - \omega \cdot t\} \qquad (33)$$

Here, "$p_o$" is the sound pressure of incoming ultrasonic signals; cos {} is a term representing the phase; "x, y" represents a position in the coordinates; "k" is a constant relating to wavelengths ($=2\pi/\lambda$, $\lambda$: wavelength); "107" is the carrier frequency of incoming ultrasonic signals; and "t" represents time. The initial phase is made zero for simplification.

Accordingly, at y=0, sound pressures at the x-axis are expressed as follows:

$$P(x,t) = P_o \cdot \cos(x \cdot k \cdot \sin\theta - \omega \cdot t) \qquad (34)$$

When the respective ultrasonic transducers "s" are successively switched at a constant speed to derive respective output signals therefrom, the position "x" of the respective ultrasonic transducers "s" is expressed as follows:

$$X = u \cdot t \qquad (35)$$

Substituting the equation (35) for "x" in the equation (34), the resultant equation will be as follows:

$$P(t) = P_o \cdot \cos\{(u \cdot k \cdot \sin\theta - \omega) \cdot t\} \qquad (36)$$

Assuming that a reception signal output of the ultrasonic receiving unit "T" is represented as "$v_o$" in response to an ultrasonic signal input thereto, and that the reception sensitivity "G" of the ultrasonic receiving unit "T" is expressed as $G = v_o/p_o$, the reception signal output v(t) in response to an incoming ultrasonic signal p(t) will be v(t) = G·p(t), and thus the equation (36) will be as follows:

$$v(t) = V_o \cos\{(u \cdot k \cdot \sin\theta - \omega) \cdot t\} \tag{37}$$

The equation (37) shows that the signals are equivalent to reception signals obtained by moving one ultrasonic transducer "s" at a speed "u" along the x-axis.

Since the frequency of v(t) is $2\pi f = u \cdot k \cdot \sin\theta - \omega$, a bearing "$\theta$" and an amplitude "$P_o$" of an ultrasonic signal coming toward the ultrasonic receiving unit "T" are obtained by Fourier-transforming v(t) to obtain a power spectrum, if "u", "k", "$\omega$" and "G" are known.

Then, the respective ultrasonic transducers are switched at a constant speed to derive output signals therefrom after a time "$\Delta\tau$" elapses with respect to the equation (35).

Here, the position "x" of the respective ultrasonic transducers "s" is expressed as follows:

$$X = u \cdot (t - \Delta\tau) \tag{38}$$

Substituting this equation for "x" in the equation (34), the resultant equation will be as follows:

$$\begin{aligned} P(t) &= P_o \cdot \cos\{u \cdot (t - \Delta t) \cdot k \cdot \sin\theta - \omega t\} \\ &= P_o \cdot \cos\{(u \cdot k \cdot \sin\theta - \omega) \cdot t - u \cdot \Delta t \cdot k \cdot \sin\theta\} \end{aligned} \tag{39}$$

Representing the reception signal outputted by the respective ultrasonic transducers "s" as v(t), the equation (39) will be as follows:

$$V(t) = V_o \cos\{(u \cdot k \cdot \sin\theta - \omega) \cdot t - u \cdot \Delta t \cdot k \cdot \sin\theta\} \tag{40}$$

While if the reception signal v(t) in the equation (37) is delayed by a time "$\Delta t$", the resultant reception signal v(t−Δt) will be as follows:

$$\begin{aligned} v(t - \Delta t) &= v_o \cdot \cos\{(u \cdot k \cdot \sin\theta - \omega) \cdot (t - \Delta t)\} \\ &= v_o \cdot \cos\{(u \cdot k \cdot \sin\theta - \omega) \cdot t - u \cdot \Delta t \cdot k \cdot \sin\theta + \omega \cdot \Delta t\} \end{aligned} \tag{41}$$

The phase difference "$\Delta\psi$" between the reception signal v(t) expressed with the equation (40) and the reception signal expressed with the equation v(t−Δt) is expressed as follows:

$$\Delta\psi = \omega \cdot \Delta t \tag{42}$$

Thus, the phase difference "$\Delta\psi$" is related to the angular carrier frequency "$\omega$" of incoming ultrasonic signals from a target.

Here, by setting the time difference "$\Delta t$", for example, equal to a scanning period for repeatedly switching the respective ultrasonic transducers "s" of the ultrasonic receiving unit "T" and by obtaining the phase difference "$\Delta\psi$", the carrier frequency "$\omega$" is determined in accordance with an equation as follows:

$$\omega = \Delta\psi/\Delta t \tag{43}$$

Doppler frequency shifts in relation to a moving target can be detected based on variations of the carrier frequency "$\omega$".

According to the present invention, in order to detect the carrier frequency "$\omega$", the reception signal v(t−Δt) with the equation (41) and the reception signal v(t) with the equation (40) are respectively Fourier-transformed to obtain phase spectrums. Phase differences "$\Delta\psi$" are obtained by performing subtractions between the two signals for respective frequency components. By dividing the resultant phase difference "$\Delta\psi$" by "$\Delta t$", the angular carrier frequency "$\omega$" of ultrasonic signals is determined for each frequency component "$2\pi f$" (thus, for each bearing "$\theta$" of incoming ultrasonic signals).

BRIEF DESCRIPTION OF DRAWINGS

FIG. 1 is a diagram for explaining the principle of an embodiment according to the present invention;

FIG. 2 shows waveforms caught by the ultrasonic receiving transducers shown in FIG. 1 and used for explaining the principle of an embodiment according to the present invention;

Throughout all the drawings, it should be noted that things having like numerals or symbols perform the same functions.

EMBODIMENTS

Embodiment 1

Figure 3:
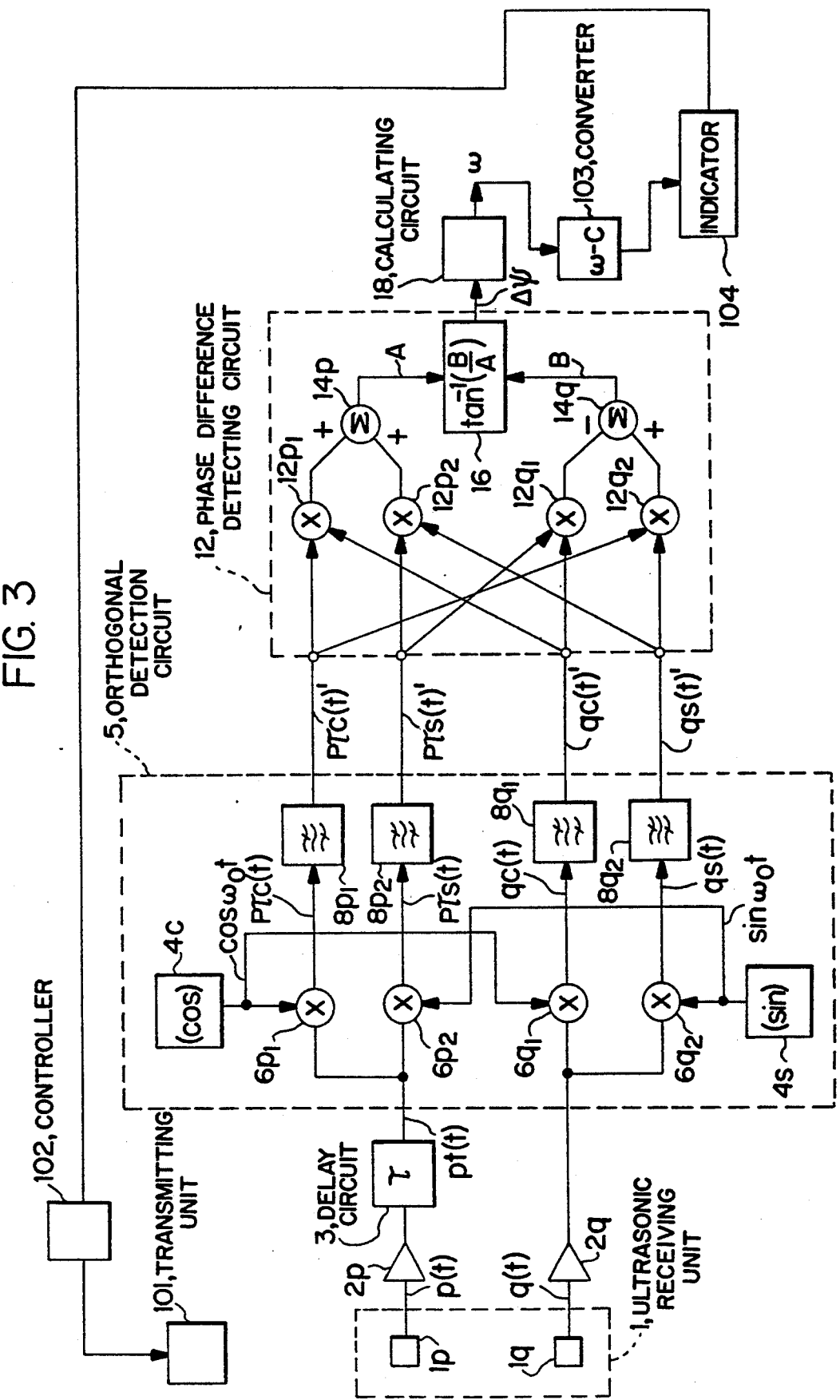
FIG. 3 shows a block diagram of an embodiment according to the present invention.

Referring to FIG. 3, a transmitting unit 101 radiates an ultrasonic search pulse signal in a wide range of directions in response to a timing signal supplied from a controller 102. An ultrasonic receiving unit I is comprised of two ultrasonic transducers 1p and 1q. As shown in FIG. 1, the ultrasonic transducers 1p and 1q are mechanically rotated about a reference point at a constant speed in a horizontal plane with the two transducers spaced by an angle "$\theta$" so that reception beams "P" and "Q" respectively formed by the ultrasonic transducers "1p" and "1q" are horizontally moved in the water. Thus, ultrasonic echo signals coming from the same direction and received by the ultrasonic transducers 1p and 1q are represented as p(t) and q(t) respectively, and one reception signal q(t) is outputted later with a time difference "τ" with respect to the other reception signal p(t).

Preamplifiers 2p and 2q amplify ultrasonic echo signals received by the ultrasonic transducers 1p and 1q respectively. A delay circuit 3 delays reception signals caught by the ultrasonic transducer 1p by the time difference "τ" so that the time difference resulting from the distance between the ultrasonic transducers 1p and 1q is removed. An orthogonal detecting circuit 5 demodulates respective reception signals p(t) and q(t) obtained by rotating reception beams formed by rotating ultrasonic transducers 1p and 1q respectively. The detecting circuit is comprised of two reference signal generating units "4c" and "4s" producing reference signals with their phases 90° out of phase with each other, four multipliers 6p1, 6p2, 6q1 and 6q2 for multiplying the reference signals supplied from the reference signal generating units "4c" and "4s" by the reception signals and four low-pass filters 8p1, 8p2 8q1 and 8q2 for eliminating high-order harmonics included in the reception signals obtained by the respective multipliers 6p1, 6p2, 6q1 and 6q2.

A phase difference detecting circuit 12 detects phase differences of ultrasonic echoes due to the Doppler effect between corresponding reception signals outputted from the orthogonal detecting circuit 5. The phase difference detecting circuit 12 is comprised of four multipliers 12p, 12p, 12q and 12q, two adders 14p and 14q and a computing unit 16 for detecting a phase difference based on the output signals from the adders 14p and 14q. A calculating circuit 18 calculates an angular carrier frequency based on the phase difference in relation to reception signals detected by the phase difference detecting circuit 12.

An angular frequency-to-color converter 103 converts signals representative of angular carrier frequencies of the echo signals supplied from the calculating circuit 18 to color signals in accordance with predetermined relationships between angular frequencies and colors and supplies the resultant converted signals to an indicator 104. The indicator 104 may be comprised of a cathode-ray tube and is controlled by the controller 102 to display the output signals of the angular frequency-to-color converter 103 in different colors depending on angular carrier frequencies of echo signals.

Hereinafter, an operation of the underwater detection system constructed as in the foregoing will be explained.

An ultrasonic search pulse signal is radiated by the transmitting unit 101. The two ultrasonic transducers 1p and 1q constituting the ultrasonic receiving unit I are rotated at a constant speed in a horizontal plane with the two transducers spaced by an angle "θ", as shown in FIG. 1. When ultrasonic echo signals come in a specific direction, the ultrasonic echo signals are caught by the ultrasonic transducers 1p and 1q, forming reception beams respectively. The received echo signals p(t) and q(t) are represented with the foregoing equations (1) and (2) respectively. These reception signals p(t) and q(t) are amplified by the preamplifiers 2p and 2q respectively. The reception signal p(t) is delayed by the time difference "II" by the delay circuit 3. The resultant reception signal p(t) will be represented with the equation (3). The reception signals p(t) and q(t) are supplied to the respective multipliers 6p1, 6p2, 6q1 and 6q2 the orthogonal detecting circuit 5 respectively.

There are produced from the respective reference signal generating circuits 4c and 4s of the detecting circuit 5 reference signals $\cos\omega_0 t$ and $\sin\omega_0 t$ with their center frequencies the same as the frequency of an ultrasonic signal radiated and with their phases mutually different by 90° from one another. The reference signal $\cos\omega_0 t$ is supplied to the two multipliers 6p1 and 6q1. The reference signal $\sin\omega_0 t$ is supplied to the other two multipliers 6p2 and 6q2. Thus, output signals of the multipliers 6p1, 6p2, 6q1 and 6q1 and 6q2 will be represented respectively as follows:

$$P\tau C(t) = P\tau(t) \cdot \cos \omega_0 t \tag{10}$$
$$= \{S(t-\tau)/2\}[\cos\{\omega(t-\tau) + \alpha + m(t-\tau) + \beta + \omega_0 t\} + \cos\{\omega \cdot (t-\tau) + \alpha + m(t-\tau) + \beta - \omega_0 t\}]$$

$$P\tau S(t) = P\tau(t) \cdot \sin \omega_0 t \tag{11}$$
$$= \{S(t-\tau)/2\}[\sin\{\omega(t-\tau) + \alpha + m(t-\tau) + \beta + \omega_0 t\} - \sin\{\omega \cdot (t-\tau) + \alpha + m(t-\tau) + \beta - \omega_0 t\}]$$

$$QC(t) = P(t) \cdot \cos \omega_0 t \tag{12}$$
$$= \{S(t-\tau)/2\}[\cos\{\omega t + \alpha + m(t-\tau) + \beta + \omega_0 t\} + \cos\{\omega t + \alpha + m(t-\tau) + \beta - \omega_0 t\}]$$

$$qS(t) = Q(t) \cdot \sin \omega_0 t \tag{13}$$
$$= \{S(t-\tau)/2\}[\sin\{\omega t + \alpha + m(t-\tau) + \beta + \omega_0 t\} - \sin\{\omega t + \alpha + m \cdot (t-\tau) + \beta - \omega_0 t\}]$$

High-order harmonics included in these signals are eliminated by the low-pass filters 8p1, 8p2, 8q1 and 8q2. The resultant signals will be represented as follows:

$$p\tau c(t)' = \{S(t-\tau)/2\} \cdot \cos\{(\omega-\omega_0)t + \alpha + m(t-\tau) + \beta - \omega\tau\} \tag{14}$$

$$p\tau s(t)' = \{S(t-\tau)/2\} \cdot \sin\{(\omega-\omega_0)t + \alpha + m(t-\tau) + \beta - \omega\tau\} \tag{15}$$

$$qc(t)' = \{S(t-\tau)/2\} \cdot \cos\{(\omega-\omega_0)t + \alpha + m(t-\tau) + \beta\} \tag{16}$$

$$qc(t)' = \{S(t-\tau)/2\} \cdot \sin\{\sin\{(\omega-\omega_0)t + \alpha + m(t-\tau) + \beta\} \tag{17}$$

The respective signals $p\tau c(t)'$, $p\tau s(t)'$, $qc(t)'$ and $qs(t)'$ obtained by the orthogonal detection are supplied to the phase difference detecting circuit 12.

The phase difference detecting circuit 12 detects a phase difference "$\omega\tau$" between the reception signals p(t) and q(t) received by the ultrasonic transducers 1p and 1q respectively based on the signals. Thus, the phase difference "$\omega\tau$" between the two reception signals p(t) and q(t) will be represented by using detected signals as follows:

$$\tan\omega\tau = \{p\tau s(t)' \cdot qc(t)' + p\tau c(t)' \cdot qs(t)'\} / \{p\tau c(t)' \cdot qc(t)' + p\tau s(t)' \cdot qs(t)'\} \tag{18}$$

Computations are performed by the respective multipliers 12p1, 12p2, 12q1 and 12q2 in accordance with equations $p\tau c(t)'\cdot qc(t)'$, $p\tau s(t)'\cdot qs(t)'$, $p\tau s(t)'\cdot qc(t)'$, $p\tau c(t)'\cdot qs(t)'$ respectively. Values "A" and "B" are obtained by the adders 14p and 14q respectively in accordance with equations as follows:

$$p\tau c(t)'\cdot qc(t)' + p\tau s(t)'\cdot qs(t)' = A$$

$$p\tau s(t)'\cdot qc(t)' + p\tau c(t)'\cdot qs(t)' = B$$

The computation unit 16 computes to obtain $\tan^{-1} B/A$ based on output signals "A" and "B" of the adders 14p and 14q. The result of the computation will be as follows:

$$\tan^{-1}(B/A) = \omega\tau = \Delta\psi \tag{19}$$

Thus, there is obtained a phase difference "$\Delta\psi$" between the reception signals p(t) and q(t) obtained by the ultrasonic transducers 1p and 1q respectively.

The computation circuit 18 calculates to produce an angular carrier frequency "$\omega$" in accordance with the equation (4), since the phase difference value "$\Delta\psi$" is supplied to the computation circuit 18.

Signals representative of the angular carrier frequency "$\omega$" of echo signals produced from the computation circuit 18 are converted to corresponding color signals by the angular frequency-to-color signal converting unit 103. The resultant color signals are displayed on the indicator 104. Thus, targets are displayed in colors depending on speeds of the moving targets.

Embodiment 2

Figure 4:
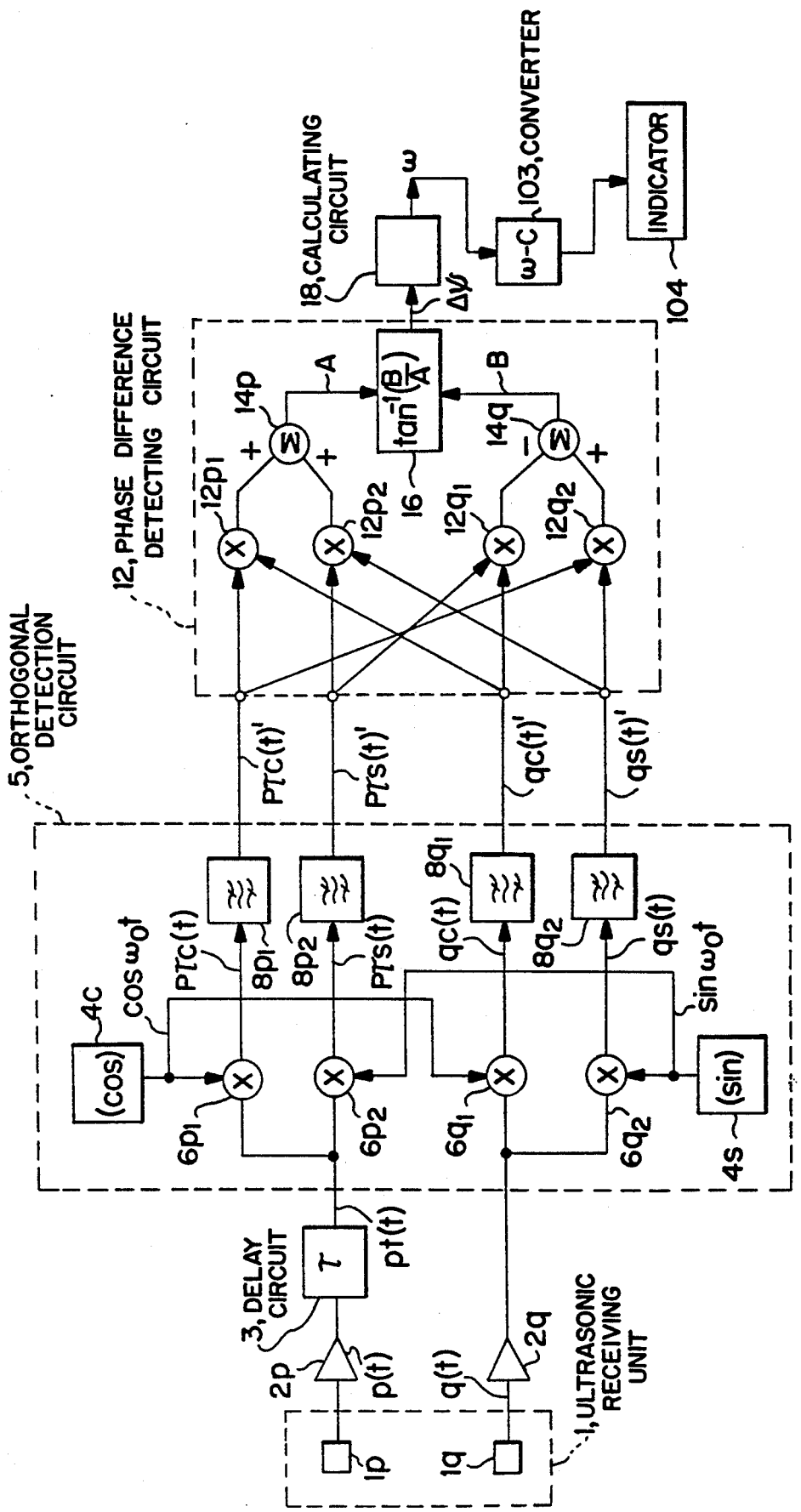
FIG. 4 shows a block diagram of another embodiment according to the present invention.

Referring to FIG. 4, an ultrasonic receiving unit 1 is comprised of two ultrasonic transducers 1p and 1q. As shown in FIG. 1, the ultrasonic transducers 1p and 1q are mechanically rotated about a reference point at a constant speed in a horizontal plane, with the transducers spaced by an angle "$\theta$" therebetween. Reception beams "P" and "Q" formed by the ultrasonic transducers respectively are horizontally moved in the water. The reception signals p(t) and q(t) resulting from ultrasonic signals coming from the same direction and caught by the ultrasonic transducers 1p and 1q respectively are produced in a manner that the reception signal q(t) is delayed by a time difference "$\tau$" with respect to the other reception signal p(t).

Preamplifiers 2p and 2q amplify the ultrasonic signals received by the ultrasonic transducers 1p and 1q respectively. A delay circuit 3 delays the reception signal caught by the ultrasonic transducer 1p by the time difference "$\tau$" so that the time difference between the reception signals caught by the ultrasonic transducers 1p and 1q respectively is removed. An orthogonal detecting circuit 5 demodulates respective reception signals p(t) and q(t) caught by rotating reception beams formed by rotating ultrasonic transducers 1p and 1q respectively. The detecting circuit is comprised of two reference signal generating units "4c" and "4s" producing reference signals with their phases 90° out of phase with each other, four multipliers 6p1, 6p2, 6q1 and 6q2 for multiplying the reference signals supplied from the reference signal generating units 4c and 4s by the reception signals and four low-pass filters 8p1, 8p2, 8q1 and 8q2 for eliminating high-order harmonics included in the reception signals obtained by the respective multipliers 6p1, 6p2, 6q1 and 6q2.

A phase difference detecting circuit 12 detects phase differences between reception signals corresponding to each other outputted from the orthogonal detecting circuit 5, with the phase differences generated in ultrasonic signals generated by targets. The phase difference detecting circuit is comprised of four multipliers 12p1, 12p2, 12q1 and 12q2, two adders 14p and 14q and a computing unit 16 for detecting a phase difference based on output signals of the two adders 14p and 14q. A calculating circuit 18 calculates angular carrier frequencies based on the phase differences in relation to respective reception signals. Operations from an instant at which incoming ultrasonic signals are received by the ultrasonic receiving unit 1 to another time instant at which signals representative of an angular carrier frequency of ultrasonic signals are produced are the same as the ones performed by the corresponding configuration of one embodiment according to the present invention shown in FIG. 3. Output signals of main units in this embodiment can be represented as the equations (1) through (18).

In this way, angular carrier frequencies "$\omega$" are continuously calculated in response to rotational movements of the ultrasonic transducers 1p and 1q so that the angular carrier frequency "$\omega$" of ultrasonic signals coming from the whole range of directions is detected.

Further, in FIG. 4, in a case in which the carrier frequency of ultrasonic signals generated by targets is known, an angular frequency-to-color signal converter 103 and an indicator 104 are provided in the same way as in FIG. 3, and signals coming from a wide range of directions are displayed in different colors depending on speeds of the moving targets.

Even if the angular carrier frequency of ultrasonic signals generated by targets is not known, the speed and direction of a moving target can be detected by measuring the angular carrier frequency "$\omega$" of ultrasonic signals coming from a wide range of directions for a time duration.

Embodiment 3

Figure 5:
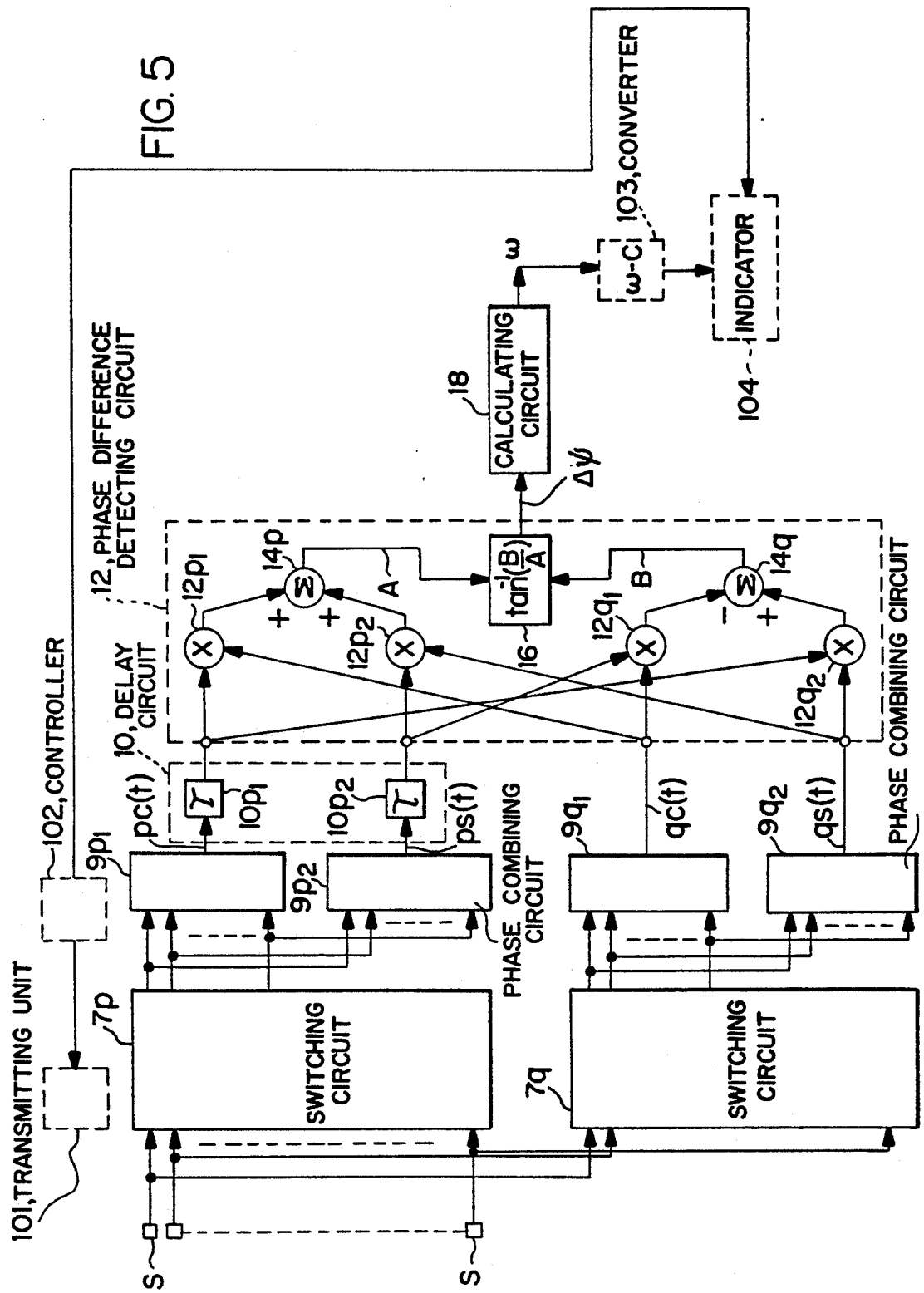
FIG. 5 shows a block diagram of another embodiment according to the present invention.
Figure 6:
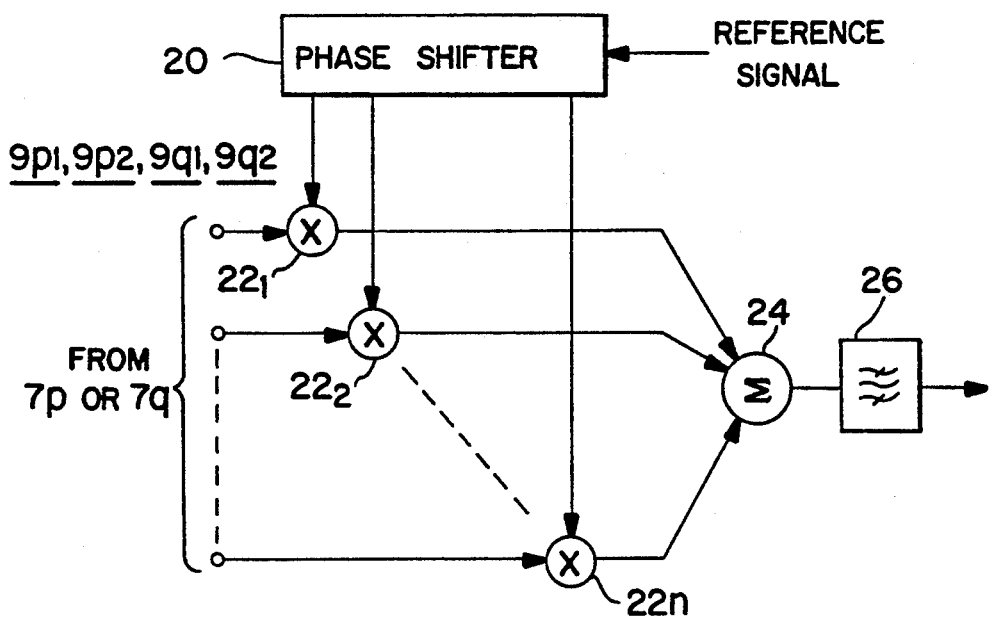
FIG. 6 shows a detailed block diagram of a phase combining circuit used in the embodiment shown in FIG. 6.

FIGS. 5 and 6 show a block diagram of an embodiment according to the present invention.

Referring to FIG. 5, 120 ultrasonic transducers "s" are disposed on a circle at equal intervals. 120 ultrasonic transducers "s" disposed in a ring form are successively and electrically switched by two switching circuits 7p and 7q respectively to successively select two groups of 30 ultrasonic transducers so that two ultrasonic reception beams are formed respectively and the two ultrasonic reception beams are rotated with a time difference "$\tau$" therebetween to search the water. When two ultrasonic reception beams are formed and rotated with this arrangement, there is an advantage that the ultrasonic reception beams can be rotated at a fast speed as compared to a method in which two ultrasonic transducers are used to form reception beams respectively and mechanically rotated to move the two reception beams as explained with the embodiment 1.

Reception signals caught by the ultrasonic transducer elements selected by the switching circuit 7p forego reception signals caught by the ultrasonic transducer elements selected by the switching circuit 7q by a time difference "$\tau$". The respective reception signals are supplied to phase combining circuit 9p1, 9p2, 9q1 and 9q2 through the switching circuit 7p and 7q respectively.

Each of the phase combining circuits 9p1, 9p2, 9q1 and 9q2 is comprised of a phase shifter 20 for shifting in phase reference signals from an oscillator (not shown) by an amount, multipliers $22_1$ through $22_n$ for multiplying the reception signals from the switching circuit 7p or 7q by the reference signals from the phase shifter 20, an adder for adding output signals of the multipliers $22_1$ through $22_n$ to one another and a filter 26 for eliminating high-order harmonics included in output signals of the adder 24.

With the phase combining circuits 9p1 and 9q1, the respective phase combining circuits $22_1$ through $22_n$ multiply output signals from the switching circuit 7p or the switching circuit 7q by reference signals $\cos(-\omega_0 t + \theta_1)$ through $\cos(\omega_0 t + \theta_1)$ respectively to combine in phase respective reception signals. While, with the phase combining circuits 9p2 and 9q2, output signals from the switching circuit 7p or the switching circuit 7q are multiplied by reference signals $\sin(\omega_0 t + \theta_1)$ through $\sin\omega_0 t + \theta_n)$ which are displaced in phase by 90° with respect to the above reference signals respectively to combine in phase respective reception signals with each other.

Output signals of delay circuits 10p1 and 10p2 delaying signals from the respective phase combining circuits 9p1 and 9p2 and output signals of the phase combining circuits 9q1 and 9q2 will be the ones expressed with the equations (14) through (17). Signal processing operations thereafter will be carried out in the same way as with the embodiment 2 to detect an angular carrier frequency $(\omega - \omega_0)$. Since the angular frequency "$\omega_0$" is known, the angular carrier frequency "$\omega$" of incoming ultrasonic signals can be calculated.

Referring to FIG. 5, there are further provided an angular frequency-to-color signal converting unit 103 and an indicator 104. In the same way as with the embodiment shown in FIG. 4, in a case in which the angular carrier frequency of ultrasonic signals generated by a target is known, signals representative of an angular carrier frequency of incoming signals from the calculation circuit 18 are converted to color signals by the angular frequency-to-color signal converting unit 103 and the resultant color signals are supplied to the indicator 104 so that ultrasonic signals coming from a wide range of directions are displayed in different colors depending on speeds of moving targets producing the ultrasonic signals. By measuring the angular carrier frequency of incoming ultrasonic signals for a time duration, information relating to the speed and moving direction of a moving target can be obtained. The construction shown in FIG. 5 will provide an underwater detection system used solely for receiving signals.

Referring to FIG. 5, there are further provided a transmitting unit 101 and a controller 102 for controlling the transmitting unit 101 and the indicator 104. In this way, there can be constructed an active sonar which radiates a search pulse signal in a wide range of directions and receives echo signals from a fish school or the like so that the targets are displayed in different colors depending on speeds of the targets.

It should be noted that although, with the one embodiment according to the present invention shown in FIGS. 5 and 6, delay circuits are comprised of the multipliers 22, the phase shifter and the oscillator to indirectly shift in phase signals received by the respective corresponding ultrasonic transducers, it is also possible to have the delay circuits comprised of inductors and condensors to directly delay signals received by the transducers by a desired amount.

Embodiment 4

Figure 7:
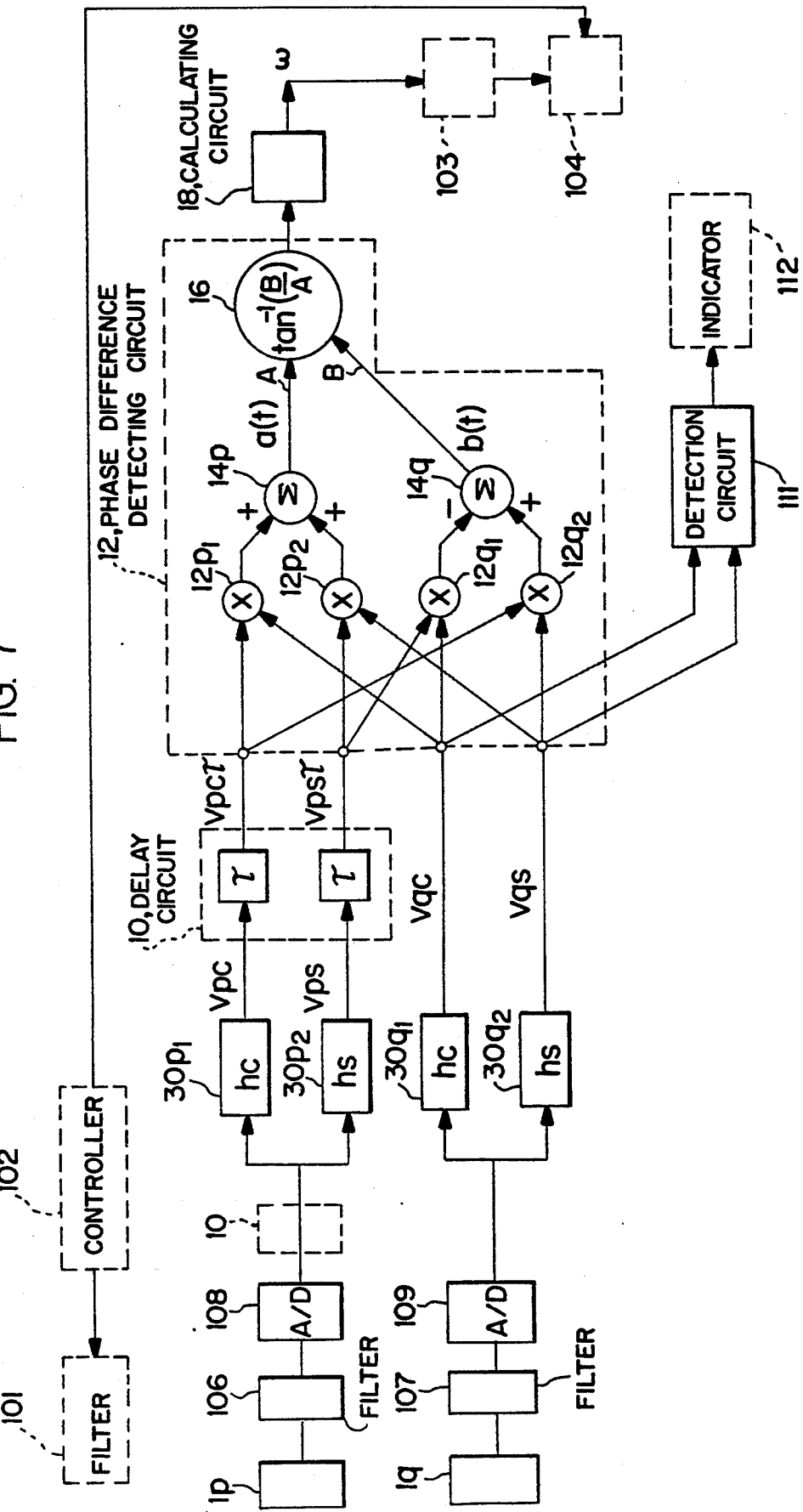
FIG. 7 shows a block diagram of another embodiment according to the present invention.

FIG. 7 shows a block diagram of an embodiment of an underwater detection system according to the present invention.

Two ultrasonic transducers 1p and 1q are mechanically rotated about a reference point at a constant speed in the same direction on the same locus with a time difference therebetween. The two ultrasonic transducers 1p and 1q supply reception signals p(t) and q(t) received thereby to analog-to-digital converting units (hereinafter referred to as "A-D converting unit") 108 and 109 through anti-aliasing filters 106 and 107 respectively. The A-D converting units 108 and 109 supply resultant converted digital signals to matched filters 30p1 and 30p2 and to matched filters 30q1 and 30q2 respectively. Each of the matched filters 30p1, 30p2, 30q1 and 30q2 is comprised of a FIR (Finite Impulse Response) type digital filter.

As explained in the foregoing, the ultrasonic reception beams "P" and "Q" respectively formed by the two ultrasonic transducers move in the water so that the Doppler effect is produced on ultrasonic signals coming from a target. Thus, respective reception signals p(t) and q (t) received by the two ultrasonic reception beams "P" and "Q" are expressed with the equations (1) and (2). The reception signals are linear FM signals the frequency of which varies with time. Accordingly, the respective reception signals p(t) and q(t) can be pulse-compressed by means of matched filters each of which having reverse time characteristics with respect to the ones of the reception signals (refer to Japanese Unexamined Patent Application No. 9-49071/1988).

In other words, four matched filters 30p1, 30p2, 30q1 and 30q2 are provided. The impulse response hc(t) of the matched filters 30p1 and 30q1 are set as follows:

$$hc(t) = \cos\{\omega a(-t) - m(-t)\} \qquad (20)$$

The impulse response of the matched filters 30q and 30q are set as follows:

$$hs(t) = \sin\{\omega a(-t) - m(-t)\} \qquad (21)$$

Here, "$\omega_a$" is a known angular carrier frequency of an ultrasonic sisal generated by a target or an angular carrier frequency of a search pulse signal radiated by the transmitting unit 101.

With the respective impulse responses set in this way, if "$\omega a$" is nearly equal to an angular frequency "$\omega$" to be detected, the reception signals outputted by the matched filters 30p1, 30p2, 30q1 and 30q2 will be respectively as follows:

$$Vpc(t) = \{S'(t)/2\} \cdot \cos\{\omega t + \alpha + m(t) + \beta\} \qquad (22)$$

$$Vps(t) = \{S'(t)/2\} \sin\{\omega t + \alpha + m(t) + \beta\} \qquad (23)$$

$$Vqc(t) = \{S'(t-\tau)/2\} \cos\{\omega t + \alpha + m(t-\tau) + \beta\} \qquad (24)$$

$$Vqs(t) = \{S'(t-\tau)/2\} \sin\{\omega t + \alpha + m(t-\tau) + \beta\} \qquad (25)$$

It is to be noted that $S'(t) = (AT/2)\text{sinc}(\mu_0 T t/2)$, $\text{sinc}(x) = \sin x / x$, $m(t) = -(\frac{1}{2})\mu_0 t^2$, $\beta = k_0 r$, $\mu_0 = k_0 r \omega s^2$, A(t): Amplitude of reception signals, T: Time width for defining impulse response characteristics, r: Radius of a rotational movement of the ultrasonic reception beam, $k_o$: Constant, $\alpha$: Initial phase of incoming ultrasonic signals (explained in the foregoing).

The signals Vpc(t) and Vps(t) delayed by a delay circuit 10 by a time "$\tau$" will be as follows:

$$Vp\tau c(t) = \{S'(t-\tau)/2\}\cos\{\omega t + \alpha + m(t-\tau) + \beta - \omega\tau\} \quad (22)'$$

$$Vp\tau c(t) = \{S'(t-\tau)/2\}\sin\{\omega t + \alpha + m(t-\tau) + \beta - \omega t\} \quad (23)'$$

It is to be noted that the delay circuit 10 is comprised of a shift-register.

The equations (22)' and (23)' are equivalent to the equations (14) and (15) in the foregoing respectively. The equations (24) and (25) are equivalent to the equations (16) and (17). Thus, the phase amounts Vp$\tau$c(t), Vp$\tau$s(t), Vqcs(t) and Vqs(t) are fundamentally the same as the signals p$\tau$c(t)', p$\tau$s(t)' qc(t)' and qs(t)' which are obtained by the orthogonal detection performed with the embodiment 1. Signal processings thereafter are carried out in the same way as with the embodiment 1 so that an angular carrier frequency "$\omega$" of incoming ultrasonic signals is detected.

Referring to FIG. 7, there are further provided an angular frequency-to-color signal converting unit 103 and an indicator 104. In the same way as with the embodiment shown in FIG. 4, in a case in which an angular frequency of ultrasonic signals generated by a target is known, signals representative of an angular carrier frequency of incoming signals outputted by the calculation circuit 18 are converted to color signals by the angular frequency-to-color signal converting unit 103 and the converted color signals are supplied to the indicator 104 so that ultrasonic signals coming from a wide range of directions are displayed in different colors depending on speeds of targets producing the ultrasonic signals. By measuring the angular carrier frequency of incoming ultrasonic signals for a time duration, information relating to speeds and moving directions of moving targets can be obtained. Such a construction provides an underwater detection system used solely for receiving signals.

Referring to FIG. 7, there are further provided a transmitting unit 101 for emitting an ultrasonic search pulse, a controller 102 for controlling the transmitting unit 101 and an indicator 104. With this arrangement, there can be constructed an active sonar which radiates a search pulse signal in a wide range of directions and receives echo signals from a fish school or the like to display the echo signals in different colors depending on speeds of the moving targets.

Although information relating to frequency of incoming signals is displayed in the foregoing, amplitude information of incoming signals caught can also be indicated. In this case, output signals "a" of the matched filter 30q1 and output signals "b" of the matched filter 30q2 are supplied to a detecting circuit 111. The detecting circuit 111 performs computations in accordance with an equation as follows:

$$\sqrt{a^2 + b^2} \quad (26)$$

The detecting circuit supplies output signals thereof to an indicator 112. Instead of supplying output signals "a" of the matched filter 30q1 and output signals "b" of the matched filter 30q2 to the detecting circuit 111, there can also be supplied output signals "a" of the matched filter 30p1 and output signals "b" of the matched filter 30p2 to the detecting circuit 111 so that amplitude information of signals coming from a wide range of directions can be similarly displayed.

It should be noted that with the embodiment shown in FIG. 7, two ultrasonic transducers are used to receive signals coming from a wide range of directions (for example the whole range of 360°), and the received signals are supplied to corresponding matched filters respectively. Instead of using two ultrasonic transducers, there can also be used ultrasonic transducer elements disposed on a circle at equal intervals which are successively switched by two switching circuits with a time difference "$\tau$" between the two switching operations to successively select two groups of contiguous transducer elements. The reception signals are derived from the transducer elements and are supplied to corresponding matched filters. With this configuration, time required for searching the water in the whole search range of 360° one time can be made shorter and thus distance resolution can be improved.

It should be noted that although the delay circuit 10 is disposed at a stage after the matched filter in the foregoing embodiment, the delay circuit 10 can also be disposed between the A-D converter 108 and the matched filter. With this arrangement, the number of the delay circuits can be decreased.

Embodiment 5

Figure 8:
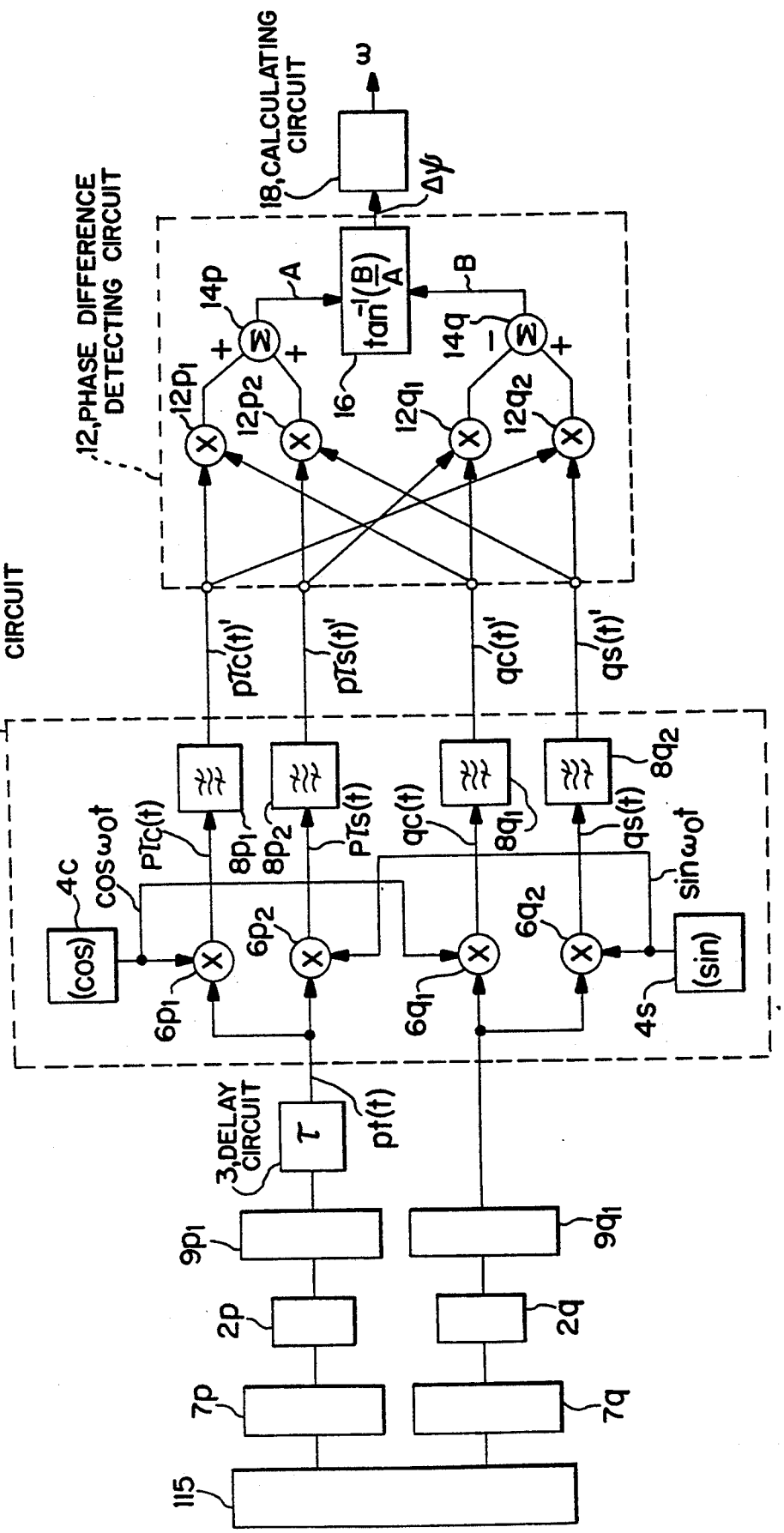
FIG. 8 shows a block diagram of another embodiment according to the present invention.

FIG. 8 shows a block diagram of an embodiment of an underwater detection according to the present invention.

With an underwater detection system constructed as the embodiment 2 shown in FIG. 4, two ultrasonic transducers are used to form reception beams respectively, and the two transducers are mechanically rotated to search the water. With this embodiment 5 reception signals caught by a plurality of ultrasonic transducers are combined in phase to form reception beams for searching the water.

A receiving unit 115 is comprised of, for example, 120 ultrasonic transducers "s" disposed on a circle at equal intervals. The one hundred and twenty ultrasonic transducers "s" disposed on a circle are successively and electrically switched by two switching circuits 7p and 7q to select two groups of thirty ultrasonic transducers. Reception signals caught by the two groups of transducers are supplied to phase combining circuits 9p1 and 9q1 through amplifiers 2p and 2q respectively. The phase combining circuits 9p1 and 9q1 combine inputted reception signals in phase to receive signals coming from only a desired direction. Thus, two ultrasonic reception beams are formed respectively. The ultrasonic transducers are successively switched by the two switching circuits 7p and 7q to form two ultrasonic reception beams which are scanned with a time difference "$\tau$" therebetween to search the water.

The reception signals caught by the phase combining circuit 9p1 are advanced by the time difference "$\tau$" with respect to the reception signals caught by the phase combining circuit 9q1. Output signals of the phase combining circuit 9p1 are delayed by a delay circuit 3 by the time "$\tau$" and then supplied to an orthogonal detecting circuit 5. Output signals of the phase combining circuit 9q1 are directly supplied to the orthogonal detecting circuit 5.

Explanations on the circuit configuration and the operation of this embodiment after the detecting circuit are omitted here, since they are the same as the ones with the embodiment shown in FIG. 4.

Figure 9:
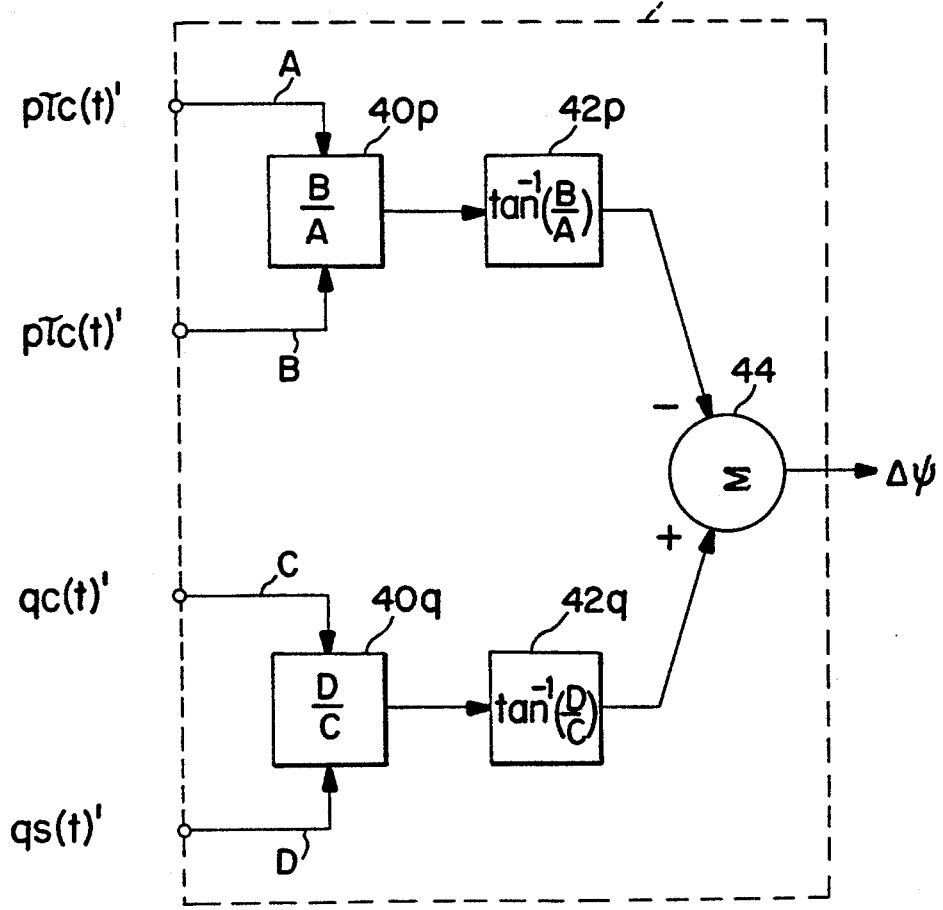
FIG. 9 shows a block diagram of a phase difference detecting circuit which can be used in place of the phase difference detecting circuit used in FIGS. 3, 4, 5, 7 or 8.

It should be noted that in place of the phase difference detecting circuit 12 constructed as shown in FIGS. 1 through 5, there can also be provided a phase difference detecting circuit 13 constructed as shown in FIG. 9. With the construction shown in FIG. 9, a divider 40p computes to obtain p$\tau$c(t)'/p$\tau$c(t)' using the relevant signals out of the respective reception signals p$\tau$c(t)', p$\tau$s(t)', qc(t)' and qs(t)' obtained by the orthogonal detection and then a computing unit 42p calculates $\tan^{-1}\{p\tau s(t)'/p\tau c(t)'\}$ to determine a phase amount of the reception signal p(t). While, the other divider 40q computes to obtain qs(t)'/qc(t)', and a divider 42q calculates to obtain $\tan^{-1}\{qs(t)'/qc(t)'\}$ to determine a phase amount of the other reception signal q(t). A subtracter 44 calculates to produce a phase difference "$\Delta\psi$" between the two reception signals.

It should be noted that a delay circuit provided in relation to one ultrasonic reception beam "P" can be disposed at any other point than the points in the foregoing embodiments. Further, although explanations are made on cases in which two ultrasonic reception beams "P" and "Q" are used, three and more than three ultrasonic reception beams can be scanned to obtain the same effects.

Embodiment 6

Although the angular carrier frequency of echo signals generated by targets is detected based on the reception signals caught by the two ultrasonic reception beams "P" and "Q" with the embodiments 1 through 5 in the foregoing, it is also possible to rotate a single ultrasonic reception beam "P" at a period "$\tau_o$" and to detect the angular carrier frequency "$\omega$" based on reception signals obtained with the present rotational search and reception signals obtained with the one or more than one previous rotational searches. With this method, there is an advantage that circuit configuration can be further simplified.

Figure 10:
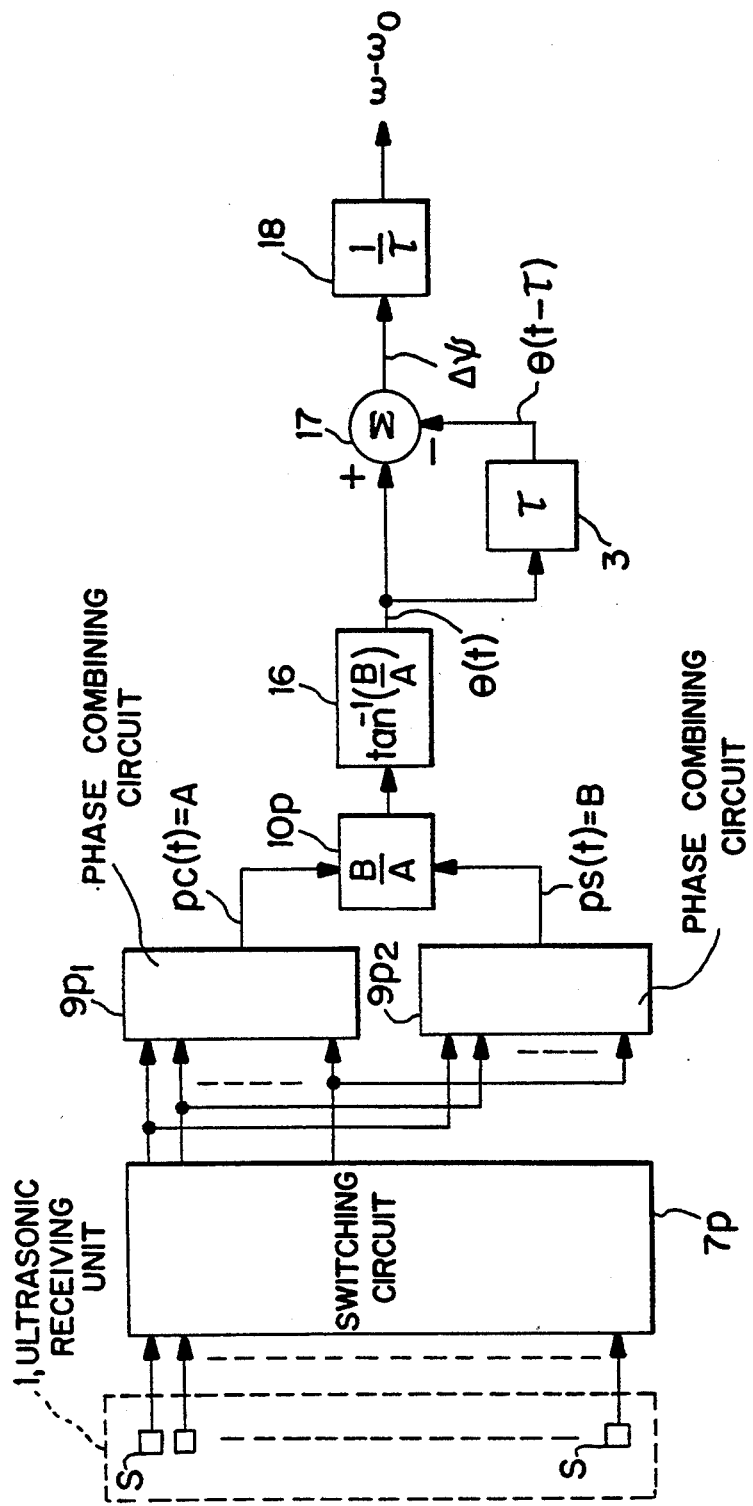
FIG. 10 shows a block diagram of another embodiment according to the present invention.

FIG. 10 shows a block diagram of an embodiment of an underwater detection system using the method. Since a single reception beam "P" is repeatedly rotated to search the water, the underwater detection system using this method is comprised of a switching circuit 7p, two phase combining circuits 9p1 and 9p2, a computing unit 16 for calculating to obtain $\tan^{-1}(B/A)$ representative of a phase amount based on output signals of a divider 10p dividing "B" by "A" outputted by the phase combining circuits 9p1 and 9p2 respectively, a delay circuit 3 for delaying output signals of the computing unit 16 by a time $\tau(=n\cdot\tau_o)$ corresponding to "n" rotations of the ultrasonic reception beam "P", a subtracter 17 as a phase difference detecting means to obtain a phase difference "$\Delta\psi$" from a difference between output signals of the computing unit 16 and output signals of the delay circuit 3 and a calculation circuit 18 for calculating the angular carrier frequency "$\omega$" from output signals of the subtracter 17.

With this construction of the embodiment, output signals of the phase combining circuits 9p1 and 9p2 are respectively expressed as follows:

$$pc(t)=\{S(t)/2\}\cdot\cos\{(\omega-\omega_o)t+\alpha+m(t)+\beta\} \quad (27)$$

$$ps(t)=\{S(t)/2\}\cdot\sin\{(\omega-\omega_o)t+\alpha+m(t)+\beta\} \quad (28)$$

The divider 10p computes to obtain ps(t)/pc(t), and the computing unit 16 computes to obtain $\tan^{-1}\{ps(t)/pc(t)\}$ to determine a phase amount $\theta(t)$ of the reception signal p(t). Thus, the phase amount $\theta(t)$ is given as follows:

$$\begin{aligned}\theta(t) &= \tan^{-1}\{ps(t)/pc(t)\} \\ &= (\omega-\omega_o)t + \alpha + m(t) + \beta\end{aligned} \quad (29)$$

Signals representative of the phase amount $\theta(t)$ are further delayed by the delay circuit 3 by a time $\tau(=n\cdot\tau_o)$ corresponding to n rotations of the ultrasonic reception beam "P" so that signals representative of phase amount $\theta(t-\tau)$ outputted by the delay circuit 3 will be as follows:

$$\theta(t-\tau)=(\omega-\omega_o)(t-\tau)+\alpha+m(t-\tau)+\beta \quad (30)$$

A subtracter 17 subtracts the phase amount outputted by the delay circuit 3 from the phase amount from the computing unit 16 to obtain the phase difference "$\Delta\psi$" which is expressed as follows:

$$\Delta\psi=\theta(t)-\theta(t-\tau)=(\omega-\omega_o)\tau+m(t)-m(t-n\cdot\tau_o) \quad (31)$$

Here, since m(t) is a periodical function of the period "$\tau_o$", there will be $m(t)=m(t-n\cdot\tau_o)$, and the equation (31) will be as in the following and thus the phase difference "$\Delta\psi$" is determined.

$$\Delta\psi=(\omega-\omega_o)\tau$$

A calculation circuit 18 calculates to obtain $\Delta\psi/\tau$. Since "$\omega_o$" is a constant, an angular carrier frequency "$\omega$" is obtained.

Embodiment 7

Figure 11:
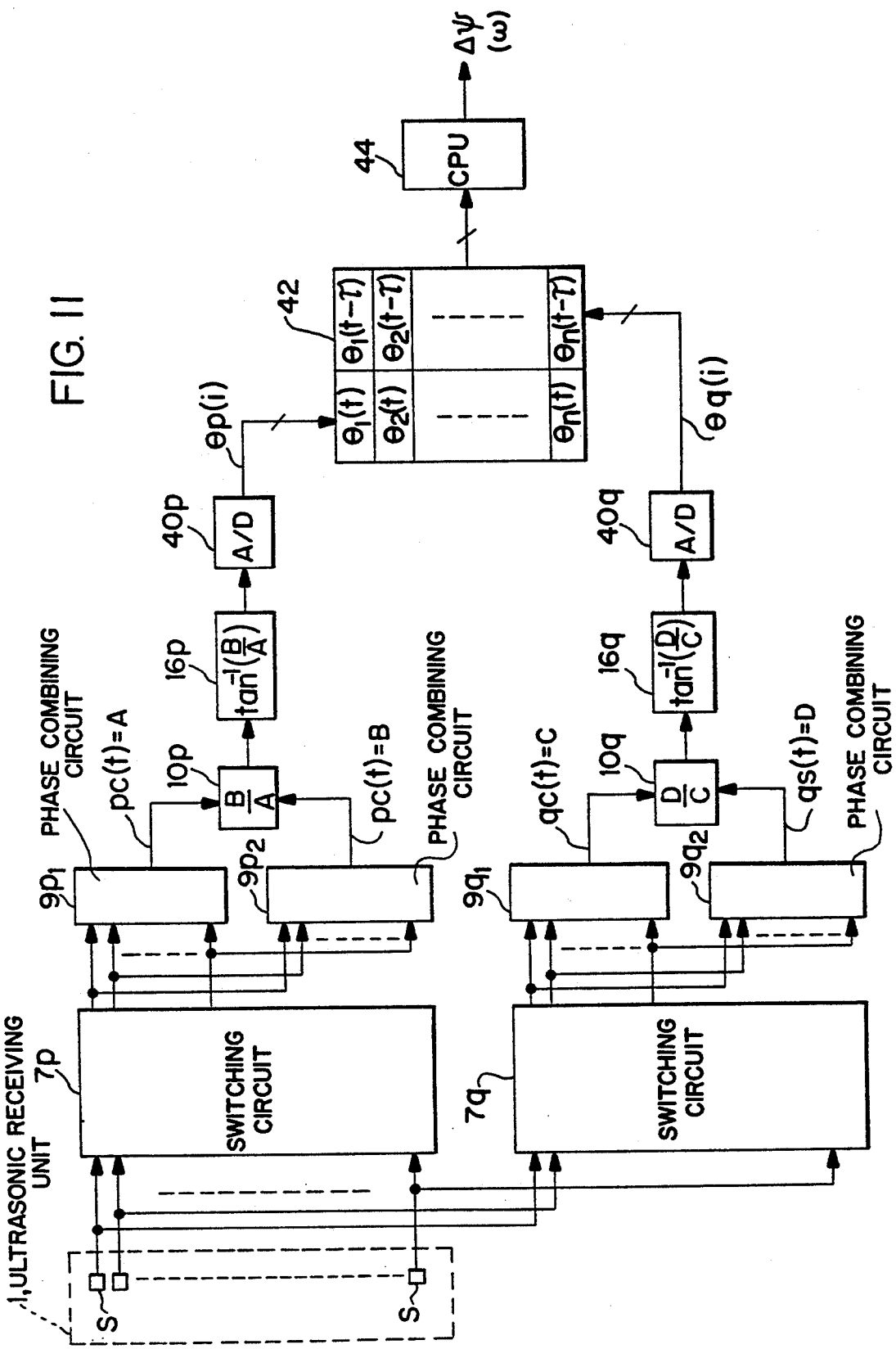
FIG. 11 shows a block diagram of another embodiment according to the present invention.
Figure 12:
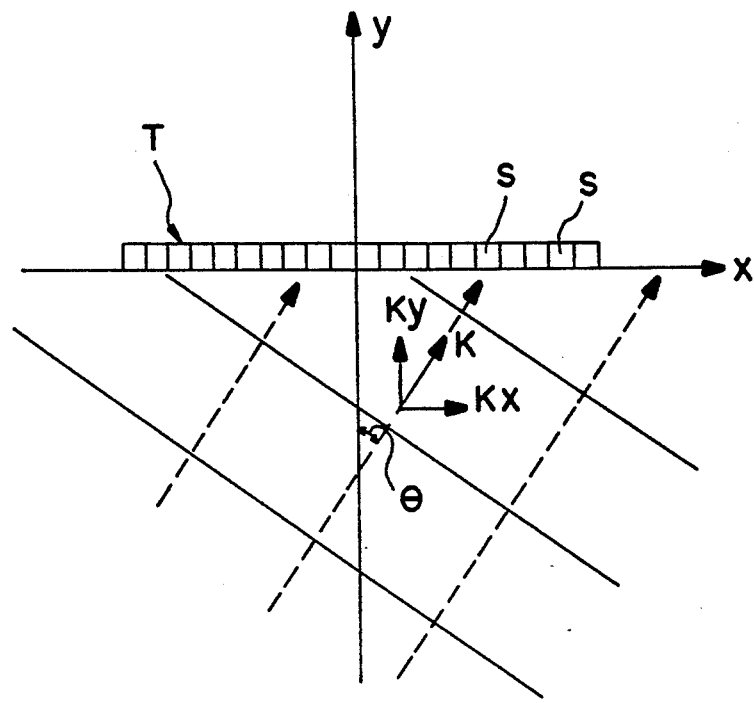
FIG. 12 shows a diagram for explaining the principle of an embodiment according to the present invention.

FIG. 11 shows a block diagram of an embodiment of an underwater detection system according to the present invention.

Some features of this embodiment are that a memory unit such as RAM or the like is used as delay means in place of the delay circuit 3 shown in FIG. 10 and CPU 44 is used as a phase difference detecting means.

There have been stored in a memory 42 phase amounts $\theta i(t)$ and $\theta i(t-\tau)$ (i=1 to n, n is the number of divided sections in the whole azimuthal range of 360) which are related with the time difference "$\tau$" in scanning the ultrasonic reception beam "P". Signals $\theta p(i)$ and $\theta q(i)$ corresponding to phase amounts obtained by the computing units 16p and 16q respectively are converted to digital signals by A-D converters 40p and 40q respectively. The converted digital signals $\theta p(i)$ and $\theta q(i)$ are inputted to the memory 42 as address data. A phase difference $\Delta\psi=\theta i(t)-\theta i(t-\tau)$ is computed based on phase amounts $\theta i(t)$ and $\theta i(t-\tau)$ which are read from the memory 42, and further the angular carrier frequency "$\omega$" is calculted.

Embodiment 8

Figure 13:
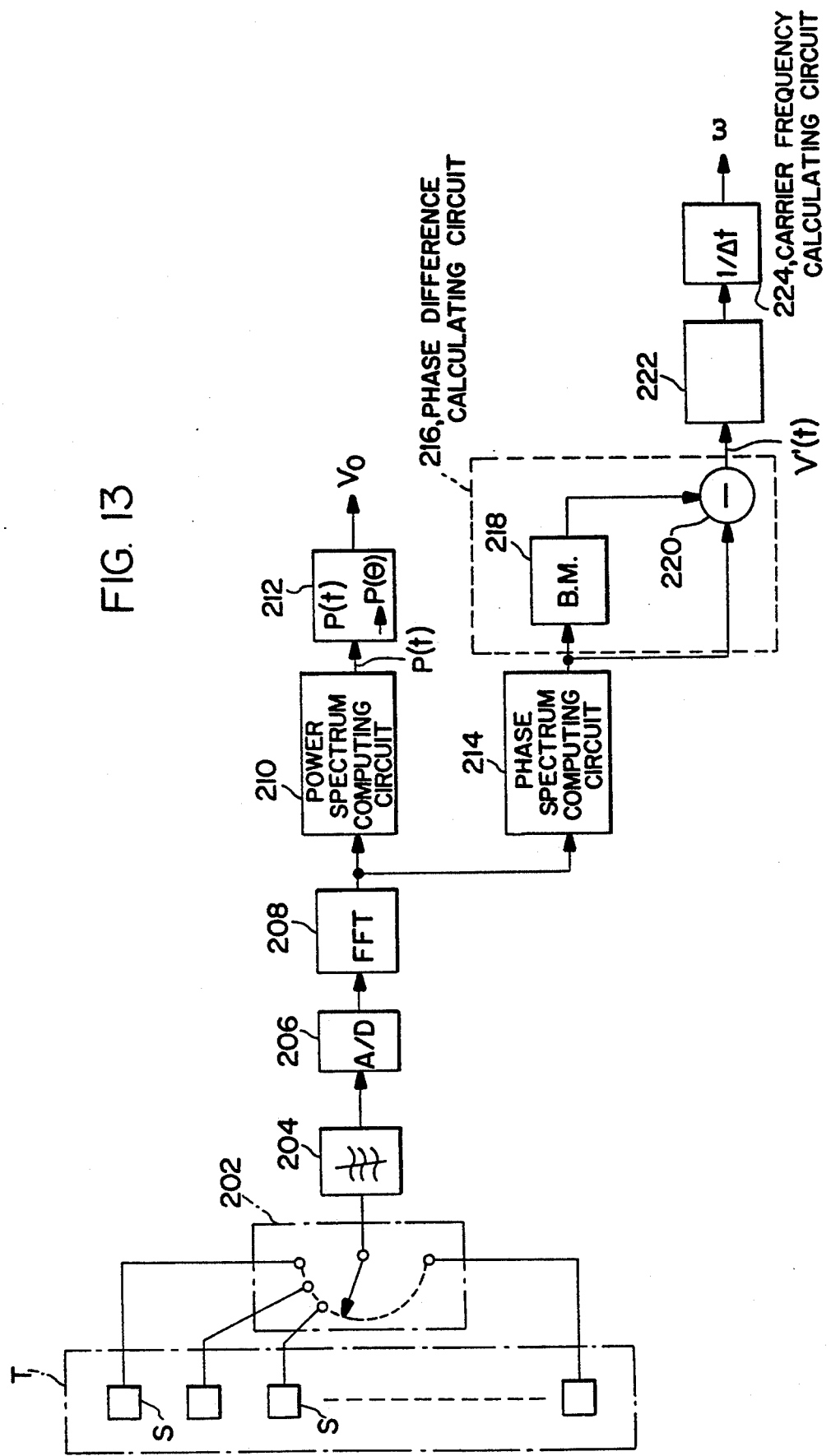
FIG. 13 shows a block diagram of another embodiment according to the present invention.

Referring to FIG. 13, an ultrasonic receiving unit "T" is comprised of many ultrasonic transducers "s" linearly disposed. The ultrasonic transducers "s" are scanned at a repetition period "$\Delta t$".

A multiplexer 202 switches the ultrasonic transducers "s" to derive reception signals therefrom. A filter 204 eliminates switching noises included in the reception signals passed through the multiplexer 204. "206" represents an A-D converter. "208" represents a Fourier transforming circuit for Fourier-transforming the digitalized reception signals.

A power spectrum computing circuit 210 computes power spectrum of reception signals based on the Fourier-transformed signals outputted by the Fourier transforming circuit 208. A scale converting circuit 212 converts a value representative of a frequency "$2\pi f$" on the horizontal axis of power spectrum coordinates to a value representative of a bearing "$\theta$" of an ultrasonic signal coming to the ultrasonic receiving unit "T".

A phase spectrum computing circuit 214 obtains phase spectrum based on the Fourier-transformed signals outputted by the Fourier transforming circuit 208. A phase difference computing circuit 216 performs a subtraction operation between the phase of each frequency component of reception signals obtained with the present scanning of the ultrasonic transducers "s" and the phase of the same frequency component of reception signals obtained with a previous scanning of the transducers to obtain a phase difference "$\Delta\psi$" therebetween based on the phase spectrum obtained by the phase spectrum computing circuit 214. The phase difference calculating circuit is, with this embodiment, comprised of a buffer memory 218 and a subtracting circuit 220.

A converting circuit 222 converts a value representative of each frequency "f" to a value representative of a bearing "$\theta$" of an ultrasonic signal coming to the ultrasonic receiving unit "T". An angular carrier frequency calculating circuit 224 calculates to produce an angular carrier frequency "$\omega$" of an ultrasonic signal coming from a target based on the phase difference "$\Delta\psi$" for each frequency component of the reception signal.

Next, there will be explained operations how to detect the incoming direction "$\theta$" and an amplitude "$P_o$" of an ultrasonic signal coming from a target and further to detect an angular carrier frequency "$\omega$" of the ultrasonic signal.

The ultrasonic transducers "s" constituting the ultrasonic receiving unit "T" are switched and scanned by the multiplexer 202 at a time period "$\Delta t$" to receive ultrasonic signals coming from targets. Switching noises included in the reception signals received by the respective ultrasonic transducers "s" are removed by the filter 204. The resultant reception signals are converted to digital signals by the A/D converter 206 and are Fourier-transformed by the Fourier transforming circuit 208. Information resulting from the Fourier transformation is supplied to the power spectrum computing circuit 210 and the phase spectrum computing circuit 214.

Figure 14A:
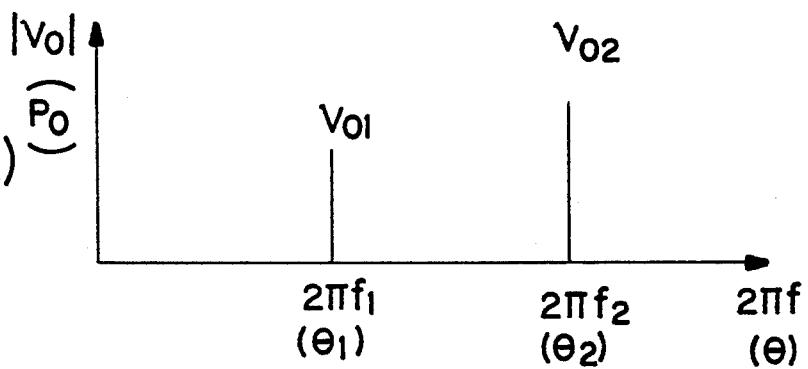
FIG. 14 shows a power spectrum and a phase power spectrum obtained with an underwater detection system according to the present invention.

The power spectrum computing circuit 210 obtains a power spectrum based on signals resulting from the Fourier transformation as shown in FIG. 14(a) in which the horizontal axis represents space frequencies "$2\pi f$", and the vertical axis represents output signals "$v_o$" of reception signals. Then, the scale converting circuit 212 converts a value representative of a frequency "$2\pi f$" on the horizontal axis of coordiantes of power spectrum to a value reprsentative of a bearing "$\theta$" of an ultrasonic signal coming to the ultrasonic receiving unit "T" and to produce the resultant signal. As expressed in the equation (37), the frequency "$2\pi f$" of the reception signal v(t) is expressed as $2\pi f = u \cdot k \cdot \sin\theta - \omega$. Since "u", "k" and "$\omega$" are all known, the frequency can be converted to a bearing "$\theta$" of an ultrasonic signal coming toward the ultrasonic receiving unit "T". Thus, it can be converted to a bearing "$\theta$" of ultrasonic signals coming toward to the ultrasonic receiving unit "T". There can be obtained bearings (in this example, "$\theta_1$", "$\theta_2$") and output levels "$V_{01}$" and "$V_{02}$" (these correspond to the amplitude "$P_o$" of incoming ultrasonic signals) of ultrasonic signals coming toward to the ultrasonic receiving unit "T".

Figure 14B:
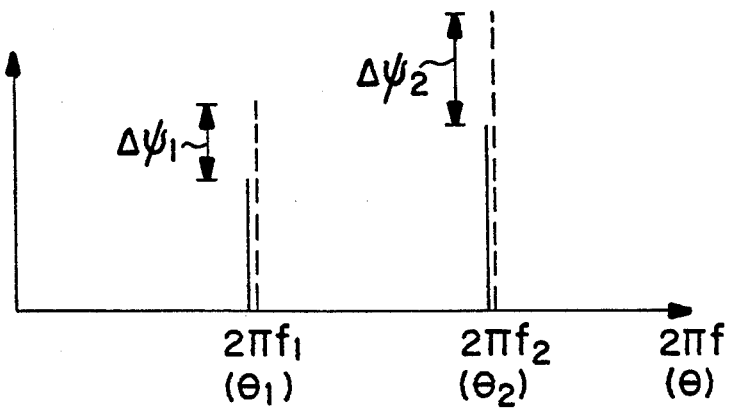

On the other hand, the phase spectrum computing circuit 214 obtains power spectrum based on the results of the Fourier transformation expressed in coordinates, the horizontal axis of which indicates the space frequency "$2\pi f$" of reception signals and the vertical axis of which indicates the phase "$\Delta\psi$" of reception signals, as shown in FIG. 14(b).

The phase spectrum data (shown in solid lines in FIG. 14(b)) obtained with the present scanning of the ultrasonic transducers "s" are supplied to the subtraction circuit 220 and also to the buffer memory 218. At this time, the phase spectrum data (shown in dotted lines in FIG. 14(b)) resulting from a previous scanning of the ultrasonic transducers "s" are read therefrom and also supplied to the subtraction circuit 220. The subtraction circuit 220 performs a subtraction between the phase of each frequency (in this example, "$2\pi f_1$", "$2\pi f_2$") component of ultrasonic signals obtained with the present scanning of the ultrasonic transducers "s" (corresponding to v(t) in the equation (40)) and the phase of the frequency component of ultrasonic signals obtained with a previous scanning of the transducers (corresponding to $v(t-\Delta t)$ in the equation (41)) to produce phase differences "$\Delta\psi_1$" and "$\Delta\psi_2$"

The converting circuit 222 converts values representative of frequencies "$2\pi f_1$" and "$2\pi f_2$" to values representative of bearings "$\theta_1$" and "$\theta_2$" of ultrasonic signals coming toward to the ultrasonic receiving unit "T". The angular carrier frequency calculating circuit 224 divides the phase differences "$\Delta\psi_1$" and "$\Delta\psi_2$" of respective reception signals by "$\Delta t$" to produce angular carrier frequencies "$\omega_1$" and "$\omega_2$" of ultrasonic signals corresponding to bearings "$\theta_1$" and "$\theta_2$" respectively, as expressed in the equation (43).

Although the angular carrier frequency calculating circuit 224 is provided to produce angular carrier frequencies "$\omega$", the calculating circuit 224 can be removed to directly utilize signals representative of the phase difference "$\Delta\psi$" outputted from the unit converting circuit 222, for example, in displaying signals in different colors depending on values of angular carrier frequencies. As apparent from the equation (42), the period "$\Delta t$" of the ultrasonic reception beam repeatedly scanned has been set constant in advance i.e., $\omega \alpha \Delta\psi$ and thus the phase difference "$\Delta\psi$" itself has information relating to an angular carrier frequency "$\omega$".

Although in the foregoing embodiment, the filter 204 is provided so that reception signsl from the respective ultrasonic transducers are inputted thereto intermittently, in order to prevent reception signals from being inputted discretely it is also possible to construct the part in a way as described in Japanese Laid-open Patent Publication No. 7350/1988 that reception signals from two continuous ultrasonic transducers "s" are inputted thereto simultaneously, and weights are given to respective reception signals by means of a converter, and the weighted signals are added to one another. With this arrangement, reception signals can be inputted continuously even if the respective ultrasonic transducers "s" are switched.

Embodiment 9

Figure 15:
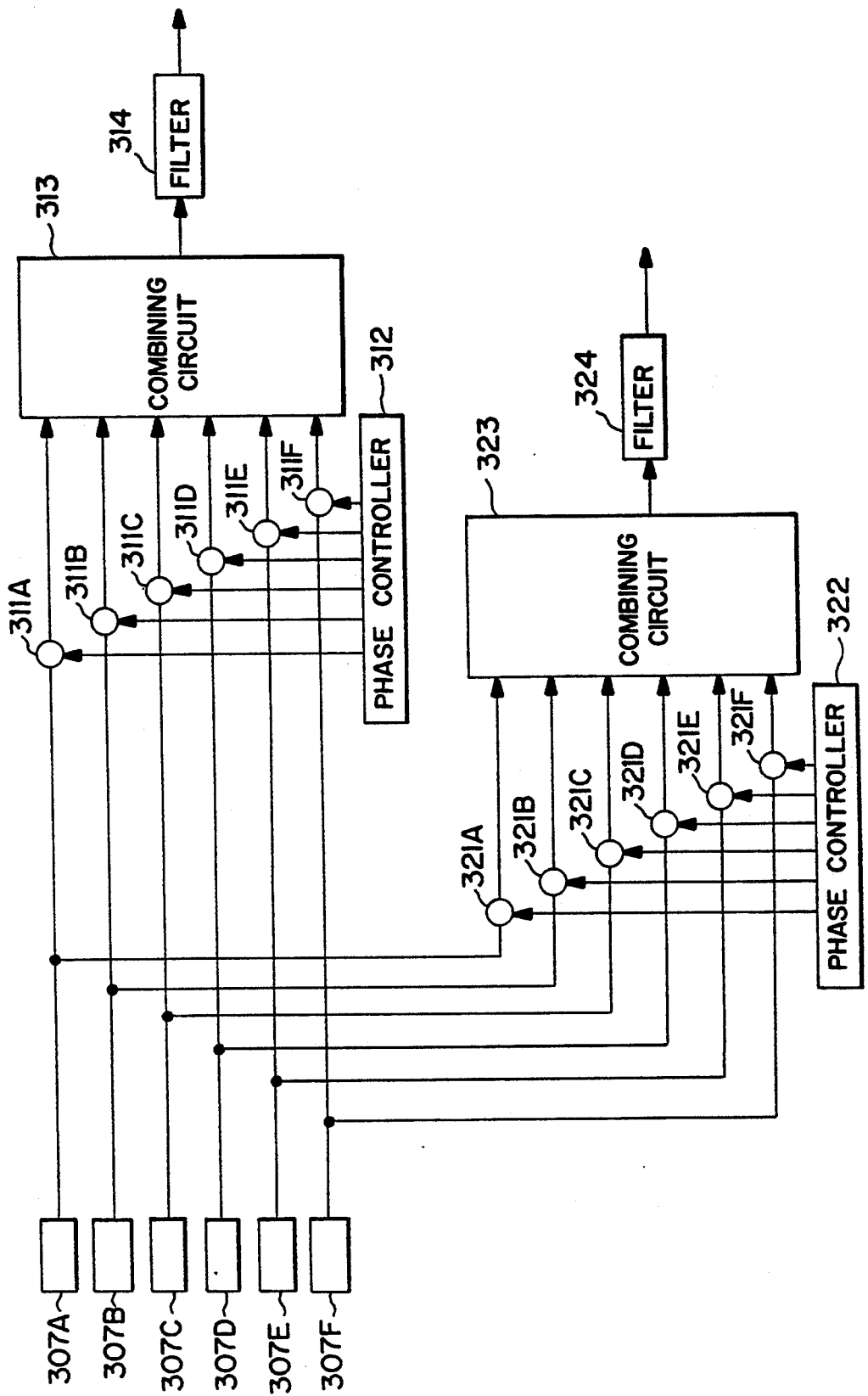
FIG. 15 shows a block diagram of the receiving unit portion of an underwater detection system embodiment.

Referring to FIGS. 3 and 15, there will be explained an embodiment of an underwater detection system according to the present invention. FIG. 15 shows a block diagram of a portion i.e., a receiving unit of an embodiment of an underwater detection system in which the present invention is embodied. In place of the ultrasonic transducers 1p and 1q respectively, connected to the amplifiers 2p and 2q shown in FIG. 3, a band-pass filter 314 and a band-pass filter 324 shown in FIG. 15 are connected thereto, so that an embodiment of the underwater detection system is constructed.

This underwater detection system appropriately shifts in phase reception signals received by the ultrasonic signals disposed on a straight line at equal intervals, combines the reception signals in phase to form two reception beams directed in different directions spaced by an angle therebetween, and moves the two reception beams in the same direction in a sectorial search area with this spaced relationship maintained.

Referring to FIG. 15, for example, six ultrasonic transducers 307A through 307F are disposed on a straight line. The reception signals received by the transducers are supplied to one input terminals of mixers 311A through 311F and also to one input terminals of mixers 321A through 321F. The other input terminals of the mixers 311A through 311F are connected to corresponding output terminals of a phase controller 312. The other input terminals of the mixers 321A through 321F are connected to corresponding output terminals of a phase controller 322. Output signals of the mixers 311A through 311F are supplied to a combining circuit 313. Output signals of the mixers 321A through 321F are supplied to a combining circuit 323. Output signals of the combining circuit 313 are supplied to a band-pass filter 314 so that frequency components of the upper band are removed. The resultant signals are supplied to the input terminal of the amplifier 2p in the block diagram of the underwater detection system shown in FIG. 3. Output signals of the combining circuit 322 are supplied to a band-pass filter 324 so that frequency components of the upper band are eliminated. The resultant signals are supplied to the input terminal of the amplifier 2q in the block diagram of the underwater detection system shown in FIG. 3.

To the input terminals of the mixers 311A through 311F, there are supplied from corresponding output terminals of the phase controller 312 signals as follows:

$$C1(t) = \cos(\omega_o t + \theta_1(t)) \quad (44)$$

$$C2(t) = \cos(\omega_o t + \theta_2(t)) \quad (45)$$

$$C3(t) = \cos(\omega_o t + \theta_3(t)) \quad (46)$$

$$C4(t) = \cos(\omega_o t + \theta_4(t)) \quad (47)$$

$$C5(t) = \cos(\omega_o t + \theta_5(t)) \quad (48)$$

$$C6(t) = \cos(\omega_o t + \theta_6(t)) \quad (49)$$

To the input terminals of the mixers 321A through 321F, there are supplied from corresponding output terminals of the phase controller 322 signals as follows:

$$C1(t-\tau) \quad (50)$$

$$C2(t-\tau) \quad (51)$$

$$C3(t-\tau) \quad (52)$$

$$C4(t-\tau) \quad (53)$$

$$C5(t-\tau) \quad (54)$$

$$C6(t-\tau) \quad (55)$$

When signals represented with the equations 44 through 55 are supplied to the input terminals of the corresponding mixers, reception signals received by the ultrasonic transducers 307A through 307F are shifted in phase by desired amounts respectively. As a result, two reception beams are formed and are moved in a sectorial search area with a spaced relationship therebetween maintained.

It should be noted that with the embodiments of the underwater detection system shown in FIGS. 8, 10, 11 and 13, in the same way with the embodiments of an underwater detection system according to the present invention shown in FIGS. 3, 5 or 7, there are provided a frequency-to-color converter for converting signals representative of angular frequencies outputted by the angular carrier frequency detecting means to color signals, an indicator for displaying output signals of the converter, and/or a transmitting unit for radiating a search pulse signal having a carrier frequency. With this arrangement, targets producing ultrasonic signals having a known carrier frequency can be displayed in colors depending on speeds of the moving targets and fish schools or the like can be displayed in colors depending on speeds thereof.

It should be noted that although in the foregoing embodiments the carrier frequency of incoming signals is detected to obtain and display speed information of moving targets, it is also possible to do other things based on the carrier frequency of incoming signals detected. For example, by detecting the carrier frequency of incoming signals and utilize the resultant information, undesired incoming signals having different frequencies may be removed so that only desired incoming signals are derived and displayed. The undesired incoming signals can not be removed with prior art technique.

It should be noted that with the embodiments shown in FIGS. 3, 4, 5, 7 and 8, the delay circuit for the one ultrasonic reception beam "P" can be provided at other points easily conceived by a person skilled in the art up to the phase difference detecting circuit than the points shown in the foregoing embodiments.

Effects Produced by the Invention

According to the present invention, there can be provided an underwater detection system which is capable of obtaining information, in a short time duration, relating to the speed or the like of targets from ultrasonic signals generated by the targets and coming from a wide range of directions.

According to the present invention, there can be provided an apparatus which is capable of detecting the carrier frequency (or angular frequency) of incoming signals which is a prerequisite for searching areas extending in a wide range of directions in a short time and obtaining information relating to the speed or the like of targets.

According to the present invention, there can be provided an underwater detection system which is capable of receiving ultrasonic signals coming from a wide range of directions and displaying targets producing the signals in different colors depending on speeds of the moving targets.

According to the present invention, there can be provided an underwater detection system which is capable of receiving ultrasonic signals having a known carrier frequency and coming from a wide range of directions and displaying targets producing the signals in different colors depending on speeds of the targets based on the received signals.

According to the present invention, there can be provided an underwater detection system which radiates an ultrasonic search pulse in a wide range of directions, receives echo signals coming from the wide range of directions, and displays targets generating the signals in different colors depending on speeds of the targets based on the received signals.

According to the present invention, areas in different directions in a wide range of directions are successively searched, and ultrasonic signals coming from each of respective directions in the wide range of directions are received at least two times, and angular carrier frequencies of ultrasonic signals are detected based on the reception signals coming from the same direction and received. As a result, as compared with prior art apparatuses, information such as fast or slow speeds or moving directions or the like of moving fish schools in areas in the wider range of directions can be obtained in a shorter time with high bearing resolution. Further, there will be produced such splendid effects as recognizing signals having different angular frequencies (sea noises, interferences and the like).

According to the present invention, a plurality of ultrasonic transducers linearly disposed are repeatedly scanned to receive incoming ultrasonic signals so that the incoming direction and the amplitude of signals coming from a wide range of directions are detected and further variations of the angular carrier frequency of the ultrasonic signals can be detected. As a result, as compared with prior art apparatuses, information such as fast or slow speeds or moving directions or the like of moving fish schools in areas in the wider range of directions can be obtained in a shorter time with high bearing resolution. Further, there will be produced such splendid effects as recognizing signals having different frequencies (sea noises, interferences and the like).

I claim:

1. An underwater detection system comprising:
    ultrasonic receiving means for successively searching areas in mutually different directions in a plurality of directions and receiving ultrasonic signals coming from the respective directions in the plurality of directions with a time difference therebetween;
    phase difference detecting means for detecting a phase difference between the phases of the carriers of the received signals having come from the same direction in the plurality of directions and caught by said receiving means; and
    computation means for computing the angular frequency or frequency of the received signals based on the phase difference between the carriers of signals.

2. An underwater detection system comprising:
    ultrasonic receiving means for successively searching areas in mutually different directions in a plurality of directions and receiving ultrasonic signals coming from the respective directions in the plurality of directions with a time difference therebetween;
    time adjusting means for adjusting the time difference in relation to respective received signals caught in each direction to remove the time difference between ultrasonic reception beams;
    phase difference detecting means for detecting a phase difference between the phases of carriers of the received signals having come from the same direction and caught by said receiving means; and
    computation means for computing the angular frequency or frequency of the received signals based on the phase difference between the carriers of signals.

3. An underwater detection system comprising:
    ultrasonic receiving means for rotating a plurality of ultrasonic reception beams about a reference point with a time difference therebetween;
    time adjusting means for adjusting the time difference in relation to each of received signals caught by the plurality of ultrasonic reception beams to remove the time difference between the ultrasonic reception beams;
    phase difference detecting means for detecting a phase difference between the phases of carriers of the received signals respectively caught by the plurality of ultrasonic reception beams; and
    computation means for computing the angular frequency of received signals based on the phase difference between the carriers of signals.

4. The underwater detection system as claimed in claim 3 wherein the ultrasonic receiving means forms two ultrasonic reception beams.

5. An underwater detection system comprising:
    ultrasonic reception means for rotating a first and a second ultrasonic reception beams about a reference point in the same direction with a time difference therebetween;
    time adjusting means for adjusting the time difference between a reception signal having come from a direction and caught by the first ultrasonic reception beam and a reception signal having come from the same direction and caught by the second ultrasonic reception beam to remove the time difference between the ultrasonic reception beams;
    orthogonal detecting means for detecting the reception signals caught by the first ultrasonic reception beam and outputted by said time adjusting means and the signals caught by said second ultrasonic reception beam;
    phase difference detecting means for detecting a phase difference between the phases of the carriers of the reception signals respectively caught by the first and the second ultrasonic reception beams based on output signals of said orthogonal detecting means; and
    computation means for computing the angular frequency of the reception signals based on the phase difference between the carriers of the reception signals.

6. An underwater detection system comprising:
    ultrasonic receiving means comprised of ultrasonic transducers disposed on a circle at equal intervals;
    first switching means for switching the ultrasonic transducers to successively select a predetermined number of ultrasonic transducers out of the ultrasonic transducers outputting a reception signal;

first and second phase combining means for combining in phase output signals of the predetermined number of ultrasonic transducers supplied through said first switching means to respectively produce signals which are out of phase by 90° with each other;

second switching means for switching the ultrasonic transducers to successively select the predetermined number of ultrasonic transducers selected by said first switching means after a predetermined time elapses outputting a reception signal;

third and fourth phase combining means for combining in phase output signals of said predetermined number of ultrasonic transducers supplied through said second switching means to respectively produce signals which are out of phase by 90° with each other;

time adjusting means for adjusting the time difference in relation to the signals outputted at said first and second phase combining means by the predetermined time to eliminate the time difference with respect to the signals outputted by said third and fourth phase combining means;

phase difference detecting means for detecting a phase difference between the carrier of the reception signals outputted by said first switching means and the carrier of the reception signals outputted by said second switching means based on the output signals of said time adjusting means and on the output signal of said third and fourth phase combining means; and computation means for computing the angular frequency of the reception signals based on he phase difference between the carriers of signals.

7. An underwater detection system comprising:
ultrasonic receiving means for directing a first and second ultrasonic receiving transducers each receiving a reception signal with a time difference therebetween successively in different directions in a plurality of directions;

time adjusting means for adjusting with respect to time reception signals caught by said first ultrasonic transducer with respect to corresponding signals caught by said second ultrasonic transducer so that the time difference between the two transducers will be eliminated;

a first matched filter having an impulse response hc(t) and pulse-compressing output signals of said time adjusting means;

a second matched filter having an impulse response hs(t) and pulse-compressing output signals of said time adjusting means;

a third matched filter having an impulse response hc(t) and pulse-compressing reception signals caught by said second ultrasonic transducer;

a fourth matched filter having an impulse response hs(t) and pulse-compressing the reception signals caught by said second ultrasonic transducer;

phase difference detecting means for detecting a phase difference between the carrier frequency of the reception signals caught by said first ultrasonic transducer and the carrier frequency of the reception signals caught by said second ultrasonic transducer based on output signals of said first, second, third and fourth matched filters; and calculating means for calculating the angular frequency of the reception signals based o the phase difference between the carriers.

8. The underwater detection system as claimed in claim 7 wherein the first and second ultrasonic transducers are mechanically rotated on the same locus.

9. The underwater detection system as claimed in claim 7 wherein the first and second ultrasonic transducers are selected out of a plurality of ultrasonic transducers by being electrically switched, with the transducers disposed on a circle spaced at equal distances.

10. An underwater detection system comprising:
ultrasonic receiving means for receiving ultrasonic reception signals coming from respective directions in a plurality of directions by rotating a single reception beam at a time period;

time adjusting means for adjusting with respect to time in relation to each of the signals coming from respective directions and caught with a time difference corresponding to the time period so that the time difference due to the time period in receiving the signals is removed;

phase difference detecting means for detecting a phase difference between reception signals coming from the same direction and caught by said receiving means; and calculating means for calculating the angular frequency of reception signals based on the phase difference between the carriers.

11. An ultrasonic detection system comprising:
ultrasonic receiving means comprised of ultrasonic transducers linearly disposed for repeatedly scanning the ultrasonic transducers at a period to receive incoming ultrasonic reception signals;

Fourier transforming circuit for Fourier-transforming reception signals caught by said ultrasonic receiving means;

phase spectrum computing circuit for obtaining a phase spectrum of the reception signals based on the signals resulting from the Fourier transformation performed in the Fourier transforming circuit;

phase difference calculating circuit for obtaining a phase difference in relation to ultrasonic signals coming from each direction by performing subtractions in phase between reception signals caught with the present scan of the ultrasonic transducers and reception signals obtained with the previous scans of the ultrasonic transducers based on the phase spectrum obtained by said phase spectrum computing circuit; and angular carrier frequency calculating circuit for calculating the angular carrier frequency of ultrasonic signals from a target based on the phase difference in relation to the reception signals detected by said phase difference calculating circuit.

12. An underwater detection system comprising:
ultrasonic receiving means for successively searching areas in different directions in a plurality of directions to receive ultrasonic reception signals coming from each of respective directions in the plurality of directions at least two times;

phase difference detecting means for detecting a phase difference between the carriers of the reception signals have come from the same direction in the plurality of directions and caught by said ultrasonic receiving means; and calculating means for calculating the angular frequency of the reception signals based on the phase difference of the carriers of signals.

13. The underwater detection system claimed in one of claims 7, 8, 9, 10 or 12 wherein the carrier frequency of an ultrasonic signal is known at the time when the ultrasonic signal is generated.

14. The underwater detection system claimed in claim 13 further comprising:
color signal generating means for producing predetermined color signals frequencies based on in response to signals representative of the angular frequencies outputted by the calculating means; and
displaying means for displaying the output signals of the color signal generating means.

15. An underwater detection system comprising:
ultrasonic transmitting means for radiating a search pulse signal having a carrier frequency in a plurality of directions;
ultrasonic receiving means for successively searching areas in mutually different directions in the plurality of directions to receive ultrasonic signals coming from each of respective directions in the plurality of directions with a time difference therebetween;
phase difference detecting means for detecting a phase difference between the carriers of the reception signals coming from the same direction in the plurality of directions and caught by said ultrasonic receiving means;
calculating means for calculating the angular frequency of the reception signals based on the phase difference of the carriers;
color signal generating means for producing predetermined color signals corresponding to angular frequencies based on signals representative of the angular frequencies outputted by said calculating means; and
displaying means for displaying the output signals of said color signal generating means.

16. An underwater detection system comprising:
ultrasonic transmitting means for radiating a search pulse signal having a carrier frequency in a plurality of directions;
ultrasonic receiving means for receiving echo reception signals coming from a plurality of directions to successively search areas in mutually different directions in the plurality of directions and receiving ultrasonic signals coming from each of respective directions in the plurality of directions with a time difference therebetween;
time adjusting means for adjusting with respect to time respective reception signals coming from respective directions and caught with the time difference so that the time difference between the ultrasonic reception beams is removed;
phase difference detecting means for detecting a phase difference between the carriers of the reception signals having come from the same direction and caught by said ultrasonic receiving means;
calculating means for calculating the angular frequency of the reception signals based on the phase difference of the carriers;
color signal generating means for producing predetermined color signals corresponding to angular frequencies based on signals representative of the angular frequencies outputted by said calculating means; and
displaying means for displaying the output signals of said color signal generating means.

17. An underwater detection system comprising:
ultrasonic transmitting means for radiating a search pulse signal having a carrier frequency in a plurality of directions;
ultrasonic receiving means receiving reception signals for rotating a plurality of ultrasonic reception beams about a reference point with a time difference between adjacent reception beams;
time adjusting means for adjusting with respect to time respective reception signals caught by the respective ultrasonic reception beams with the time difference so that the time difference between the adjacent ultrasonic reception beam is removed;
phase difference detecting means for detecting a phase difference between the carriers of the reception signals caught by said plurality of ultrasonic reception beams;
calculating means for calculating the angular frequency of the reception signals based on the phase difference of the carriers;
color signal generating means for producing predetermined color signals corresponding to angular frequencies based on signals representative of the angular frequencies outputted by said calculating means; and
displaying means for displaying output signals of said color signal generating means.

18. The underwater detection system as claimed in claim 17 wherein the ultrasonic receiving means forms two ultrasonic reception beams.

19. An underwater detection system comprising:
ultrasonic transmitting means for radiating a search pulse signal having a carrier frequency in a plurality of directions;
ultrasonic receiving means for rotating a first and a second ultrasonic reception beams in the same direction about a reference point with a time difference therebetween;
time adjusting means for adjusting with respect to time, reception signals coming from a direction and caught by said first ultrasonic reception beam with respect to reception signals coming from the same direction and caught by said second ultrasonic reception beam so that the time difference between the ultrasonic reception beams is removed;
orthogonal detecting means for detecting the reception signals caught by the first ultrasonic reception beam and outputted by said time adjusting means and the signals caught by said second ultrasonic reception beam;
phase difference detecting means for detecting a phase difference between the carriers of the reception signals caught by said first and second ultrasonic reception beams respectively based on the output signals of said orthogonal detecting means;
calculating means for calculating the angular frequency of the reception signals based on the phase difference of the carriers;
color signal generating means for producing predetermined color signals corresponding to the angular frequencies based on signals representative of the angular frequencies outputted by said calculating means; and
displaying means for displaying the output signals of said color signal generating means.

20. An underwater detection system comprising:
ultrasonic transmitting means for radiating a search pulse signal having a carrier frequency in a plurality of directions;

ultrasonic receiving means receiving reception signals comprised of ultrasonic transducers disposed on a circle at equal intervals;

first switching means for switching the ultrasonic transducers to successively select a predetermined number of ultrasonic transducers;

first and second phase combining means for combining in phase the output signals of the ultrasonic transducers supplied through said first switching means to produce signals the phases of which being different by 90° from one another;

second switching means for switching the ultrasonic transducers to successively select the predetermined number of the ultrasonic transducers selected by said first switching means after a predetermined time elapses;

third and fourth phase combining means for combining in phase the output signals of the predetermined number of ultrasonic transducers supplied through said second switching means to produce signals the phases of which being mutually different by 90° from one another;

time adjusting means for adjusting in time the signals outputted by said first and second phase combining means so that the time difference between the signals outputted by said third and fourth phase combining means are removed;

phase difference detecting means for detecting a phase difference between the carrier of the reception signals outputted by said first switching means and the carrier of the reception signals outputted by said second switching means based on the output signals of said time adjusting means and the output signals of said third and fourth phase combining means;

calculating means for calculating the angular frequency of the reception signals based on the phase difference of the carriers;

color signal generating means for producing predetermined color signals corresponding to angular frequencies based on signals representative of the angular frequency outputted by said calculating means; and displaying means for displaying output signals of said color signal generating means.

21. An underwater detection system comprising:

ultrasonic transmitting means for radiating a search pulse signal having a carrier frequency in a plurality of directions;

ultrasonic receiving means for successively directing first and second ultrasonic receiving transducers each receiving reception signals in each of respective different directions with a time difference therebetween in the plurality of directions;

time adjusting means for adjusting with respect to time reception signals caught by said first ultrasonic transducer with respect to signals caught by said second ultrasonic transducer by the time difference so that the time difference between the two transducers is removed;

first matched filter having an impulse response hc(t) and pulse-compressing the output signals of said time adjusting means;

second matched filter having an impulse response hs(t) and pulse-compressing the output signals of said time adjusting means;

third matched filter having an impulse response hc(t) and pulse-compressing reception signals caught by said second ultrasonic transducer;

fourth matched filter having an impulse response hs(t) and pulse-compressing reception signals caught by said second ultrasonic transducer;

phase difference detecting means for detecting a phase difference between the carrier of the reception signals caught by said first ultrasonic transducer and the carrier of the reception signals caught by said second ultrasonic transducer based on the output signals of said first, second, third and fourth matched filters;

calculating means for calculating the angular frequency of the reception signals based on the phase difference of the carriers;

color signal generating means for producing predetermined colors corresponding to the angular frequency based on signals representative of angular frequencies outputted by said calculating means; and displaying means for displaying output signals of said color signal generating means.

22. The underwater detection system as claimed in claim 21 wherein the first and the second ultrasonic transducers are mechanically rotated on the same locus.

23. The underwater detection system as claimed in claim 21 wherein the first or the second ultrasonic transducer are selected out of a plurality of ultrasonic transducers disposed on a circle at equal intervals by electrically switching the plurality of transducers.

24. An ultrasonic detection system comprising:

ultrasonic transmitting means for emitting a search pulse signal having a carrier frequency in a plurality of directions;

ultrasonic receiving means for receiving ultrasonic reception signals coming from respective directions in a plurality of directions by rotating a single reception beam in a time period;

time adjusting means for adjusting with respect to time each of the signals coming from respective directions and caught by a time difference corresponding to the time period so that the time difference due to the time period in receiving the signals is removed;

phase difference detecting means for detecting a phase difference between the carriers of the reception signals coming from the same direction and caught by said receiving means;

calculating means for calculating the angular frequency of the reception signals based on the phase difference of the carriers;

color signal generating means for producing predetermined color signals corresponding to angular frequencies based on the angular frequency outputted by said calculating means; and displaying means for displaying output signals of said color signal generating means.

25. An underwater detection system comprising:

ultrasonic transmitting means for emitting a search pulse signal having a carrier frequency in a plurality of directions;

ultrasonic receiving means comprised of ultrasonic transducers linearly disposed for repeatedly scanning the ultrasonic transducers at a period to receive incoming ultrasonic reception signals;

Fourier transforming circuit for Fourier-transforming the reception signals caught by said ultrasonic receiving means;

phase spectrum computing circuit for obtaining phase spectrum of the reception signals based on the signals resulting from the Fourier transformation performed in the Fourier transforming circuit;

phase difference calculating circuit for obtaining a phase difference in relation to ultrasonic signals coming from each direction by performing a subtraction in phase between a reception signal caught with the present scan of the ultrasonic transducers and a reception signal obtained with the previous scans of the ultrasonic transducers based on the phase spectrum obtained by said phase spectrum computing circuit;

angular carrier frequency calculating circuit for calculating the angular carrier frequency of ultrasonic signals from a target based on the phase difference in relation to the reception signals detected by said phase difference calculating circuit;

color signal generating means for producing predetermined color signals corresponding to angular frequencies based on signals representative of the angular carrier frequency outputted by said angular frequency calculating circuit; and displaying means for displaying output signals of said color signal generating means.

26. An underwater detection system comprising:
ultrasonic transmitting means for radiating a search pulse having a carrier frequency in a plurality of directions;

ultrasonic receiving means for successively searching areas in mutually different directions in the plurality of directions to receive ultrasonic reception signals coming from each of respective directions therein at least two times;

phase difference detecting means for detecting a phase difference between the carriers of the reception signals having come from the same direction in the plurality of directions and caught by said ultrasonic receiving means;

calculating means for calculating the angular frequency of the reception signals based on the phase difference of the carriers of signals;

color signal generating means for producing predetermined color signals corresponding to angular frequencies based on signals representative of the angular carrier frequency outputted by said calculating means; and displaying means for displaying output signals of said color signals generating means.

27. The underwater detection system as claimed in claim 26 further comprising:
signal generating means for generating signals representative of amplitudes of incoming signals; and
an indicator for indicating the amplitude signals.

28. An underwater detection system for searching the water in a plurality of directions by repeatedly moving a single reception beam therein at a period comprising:
ultrasonic receiving means comprised of ultrasonic transducers disposed on a circle at equal intervals;

switching means for switching the ultrasonic transducers to successively select a predetermined number of said ultrasonic transducers;

first and second phase combining means for combining in phase output signals of said predetermined number of ultrasonic transducers supplied through said switching means to respectively produce signals the phases of which are mutually different by 90° from one another;

a dividing circuit for performing a dividing operation on output signals of said first phase combining means and said second phase combining means;

computing means for computing phase amounts based on output signals of said dividing circuit;

delaying means for delaying output signals of said computing circuit by a time corresponding to the period;

a subtraction circuit for obtaining a phase difference by performing a subtraction operation between output signals of said computing circuit and output signals of said delaying means; and calculating means for calculating the angular carrier frequency of incoming signals based on signals representative of the phase difference outputted by said subtraction circuit.

29. The underwater detection system claimed in one of claims 1, 2, 3, 4, 5, 6 or 11 wherein the carrier of an ultrasonic signal is known at the time when the ultrasonic signal is generated.

* * * * *